US008054866B2

(12) United States Patent
Sasaoka et al.

(10) Patent No.: US 8,054,866 B2
(45) Date of Patent: Nov. 8, 2011

(54) MC-CDMA SYSTEM, TRANSMITTER AND RECEIVER

(75) Inventors: Hideichi Sasaoka, Kyoto (JP); Hisato Iwai, Kyoto (JP); Yusuke Miyamoto, Kyoto (JP)

(73) Assignee: The Doshisha, Kyoto (JP)

( * ) Notice: Subject to any disclaimer, the term of this patent is extended or adjusted under 35 U.S.C. 154(b) by 683 days.

(21) Appl. No.: 12/161,128

(22) PCT Filed: Jan. 17, 2007

(86) PCT No.: PCT/JP2007/051022
§ 371 (c)(1),
(2), (4) Date: Jul. 16, 2008

(87) PCT Pub. No.: WO2007/083819
PCT Pub. Date: Jul. 26, 2007

(65) Prior Publication Data
US 2010/0166043 A1  Jul. 1, 2010

(30) Foreign Application Priority Data
Jan. 17, 2006  (JP) .................................. 2006-009005

(51) Int. Cl.
*H04B 1/00*  (2006.01)
*H04L 27/28*  (2006.01)
(52) U.S. Cl. ........................................ 375/141; 375/260
(58) Field of Classification Search .................. 375/141, 375/146, 147, 260, 267; 370/320, 335, 342, 370/441
See application file for complete search history.

(56) References Cited

U.S. PATENT DOCUMENTS

| 2005/0141473 | A1* | 6/2005 | Lim et al. ..................... 370/342 |
| 2006/0062320 | A1* | 3/2006 | Luz et al. ..................... 375/269 |
| 2006/0153144 | A1* | 7/2006 | Kwun et al. .................. 370/335 |
| 2008/0219147 | A1  | 9/2008 | Hara et al. |
| 2011/0058592 | A1* | 3/2011 | Seki et al. .................... 375/142 |

FOREIGN PATENT DOCUMENTS

| JP | 2003-101511 A | 4/2003 |
| JP | 2005-192000   | 7/2005 |
| JP | 2007-529276   | 2/2007 |

OTHER PUBLICATIONS

Erino Sato and Hideichi Sasaoka, "Maximum Likelihood Multi-User Detection Using Vitabialgorithm for MC-CMDA Systems," Technical Report of IEICE RCS2003-380, Mar. 2004, pp. 161-166.

(Continued)

*Primary Examiner* — Don N Vo
(74) *Attorney, Agent, or Firm* — Foley & Lardner LLP

(57) ABSTRACT

A MC-CDMA transmitter and an MC-CDMA receiver are provided, which use a novel orthogonal spreading code that allows an effect by a delay wave to appear in only a specific user. An MC-CDMA system includes: a transmitter which multiplies a transmitting signal by a sinusoidal signal which has an amplitude of r and is orthogonal as a result that the frequency periods are different among users, in a frequency domain to be spread and split into orthogonal sub-carriers, and multiplexes the sub-carriers; and a receiver for receiving a transmitting signal from the transmitter in a manner that a sinusoidal signal, which has an amplitude of r and is orthogonal as a result that the frequency periods are different among users, is multiplied by the transmitting signal in a frequency domain, and the resultant is inversely spread.

9 Claims, 15 Drawing Sheets

OTHER PUBLICATIONS

International Search Report and Written Opinion for PCT/JP2007/051022, mailed Apr. 17, 2007.

Anwar, K. et al., "A New Design of Carrier Interferometry OFDM with FFT as Spreading Codes," *2006 IEEE Radio and Wireless Symposium*, Jan. 2006, pp. 543-546.

Notice of Reasons for Rejection for JP 2006-009005 mailed Jan. 20, 2010 (with English translation).

Office Action issued in JP 2006-009005 mailed Nov. 13, 2009 (with English translation).

Okada, Koichi et al., "Improvement of Error Characteristics of OFDM Signal by Data Conversion," The 1996 Communications Society Conference of IEICE, Aug. 38, 1996, vol. 2, p. 394 (with English translation).

\* cited by examiner

FIG.1 (Prior Art)

| $C^{(0)}$ | $C^{(1)}$ | $C^{(2)}$ | $C^{(3)}$ | $C^{(k)}$ | $C^{(k-3)}$ | $C^{(k-2)}$ | $C^{(k-1)}$ |
|---|---|---|---|---|---|---|---|
| 1 | 1 | 1 | 1 | ⋮ | 1 | 1 | 1 |
| 1 | −1 | 1 | −1 | ⋮ | −1 | 1 | −1 |
| 1 | 1 | −1 | −1 | ⋮ | 1 | −1 | −1 |
| ⋮ | ⋮ | ⋮ | ⋮ | ⋮ | ⋮ | ⋮ | ⋮ |
| 1 | −1 | 1 | −1 | ⋮ | 1 | −1 | −1 |
| 1 | 1 | −1 | −1 | ⋮ | −1 | 1 | −1 |
| 1 | −1 | −1 | 1 | ⋮ | 1 | 1 | −1 |

FIG.2

| $C^{(0)}$ | $C^{(1)}$ | $C^{(2)}$ | $C^{(3)}$ | ... | $C^{(k)}$ | ... | $C^{(k-1)}$ |
|---|---|---|---|---|---|---|---|
| 1.00 | 1.00 | 1.00 | 1.00 | | ... | | 1.00 |
| 1.00 | 0.98+0.20i | 0.92+0.38i | 0.83+0.56i | | ... | | 0.98−0.20i |
| 1.00 | 0.92+0.38i | 0.71+0.71i | 0.38+0.92i | | ... | | 0.92−0.38i |
| ... | ... | ... | ... | | ... | | ... |
| $e^{j2\pi 0 f_m}$ | $e^{j2\pi 1 f_m}$ | $e^{j2\pi 2 f_m}$ | $e^{j2\pi 3 f_m}$ | | $e^{j2\pi k f_m}$ | | $e^{j2\pi (K-1) f_m}$ |
| ... | ... | ... | ... | | ... | | ... |
| $e^{j2\pi 0 f_{L-1}}$ | $e^{j2\pi 1 f_{L-1}}$ | $e^{j2\pi 2 f_{L-1}}$ | $e^{j2\pi 3 f_{L-1}}$ | | $e^{j2\pi k f_{L-1}}$ | | $e^{j2\pi (K-1) f_{L-1}}$ |

FIG. 3
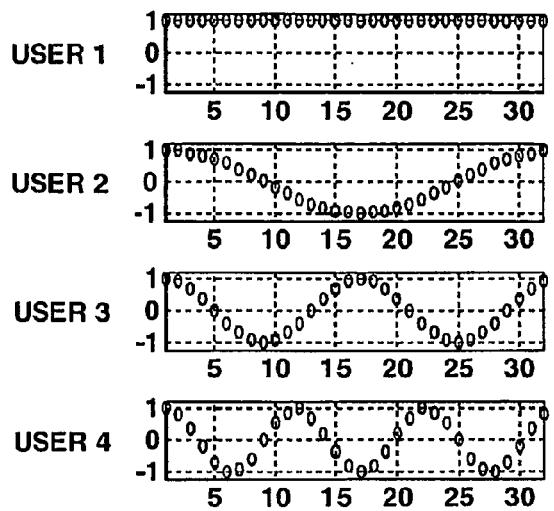
(a) REAL PART COMPONENT OF $c^{(k)}$
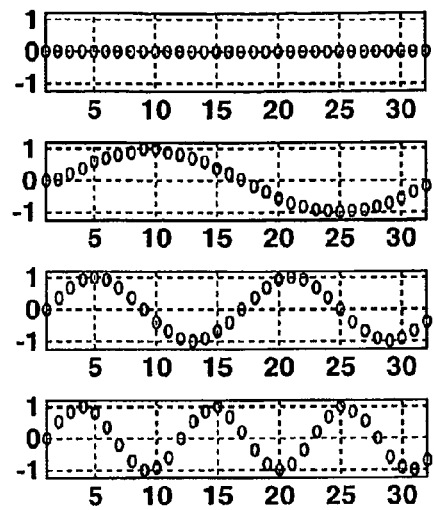
(b) IMAGINARY PART COMPONENT OF $c^{(k)}$
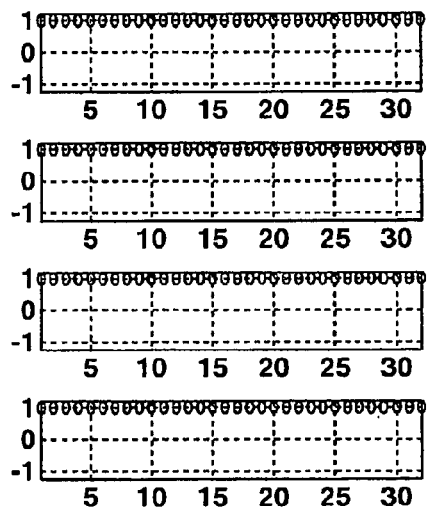
(c) AMPLITUDE OF $c^{(k)}$

FIG.5
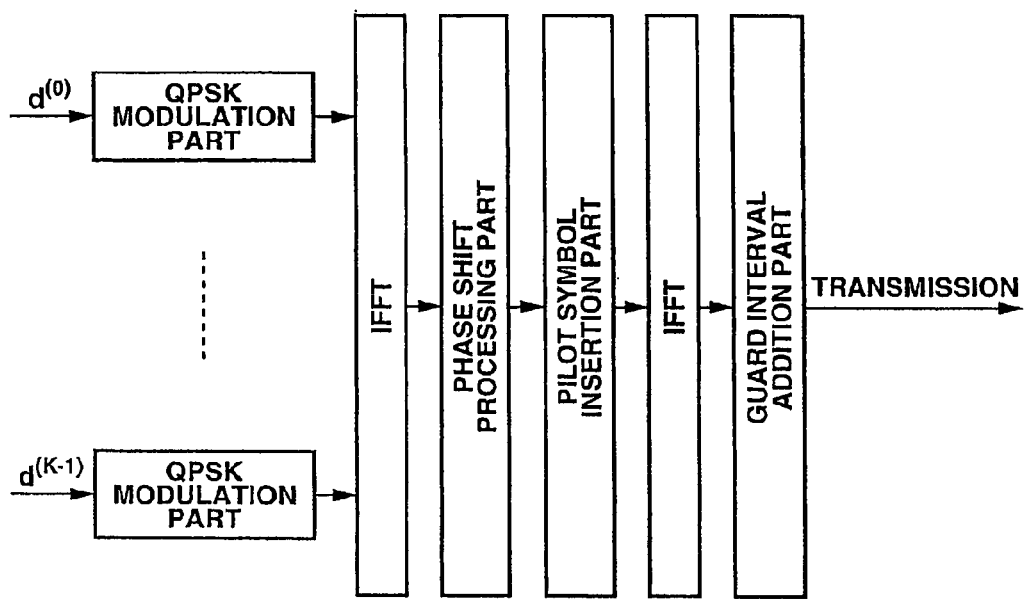
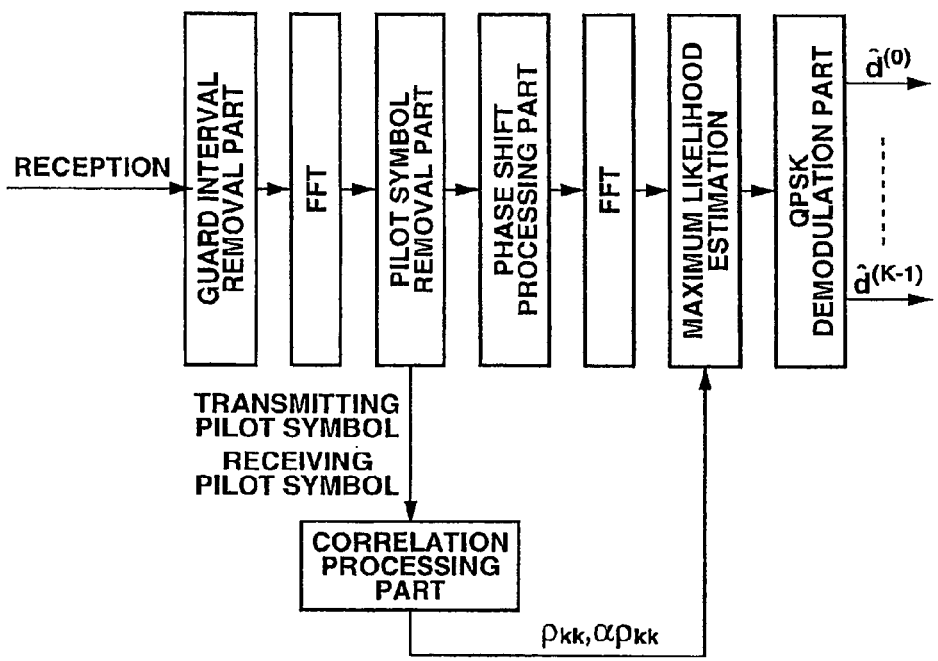

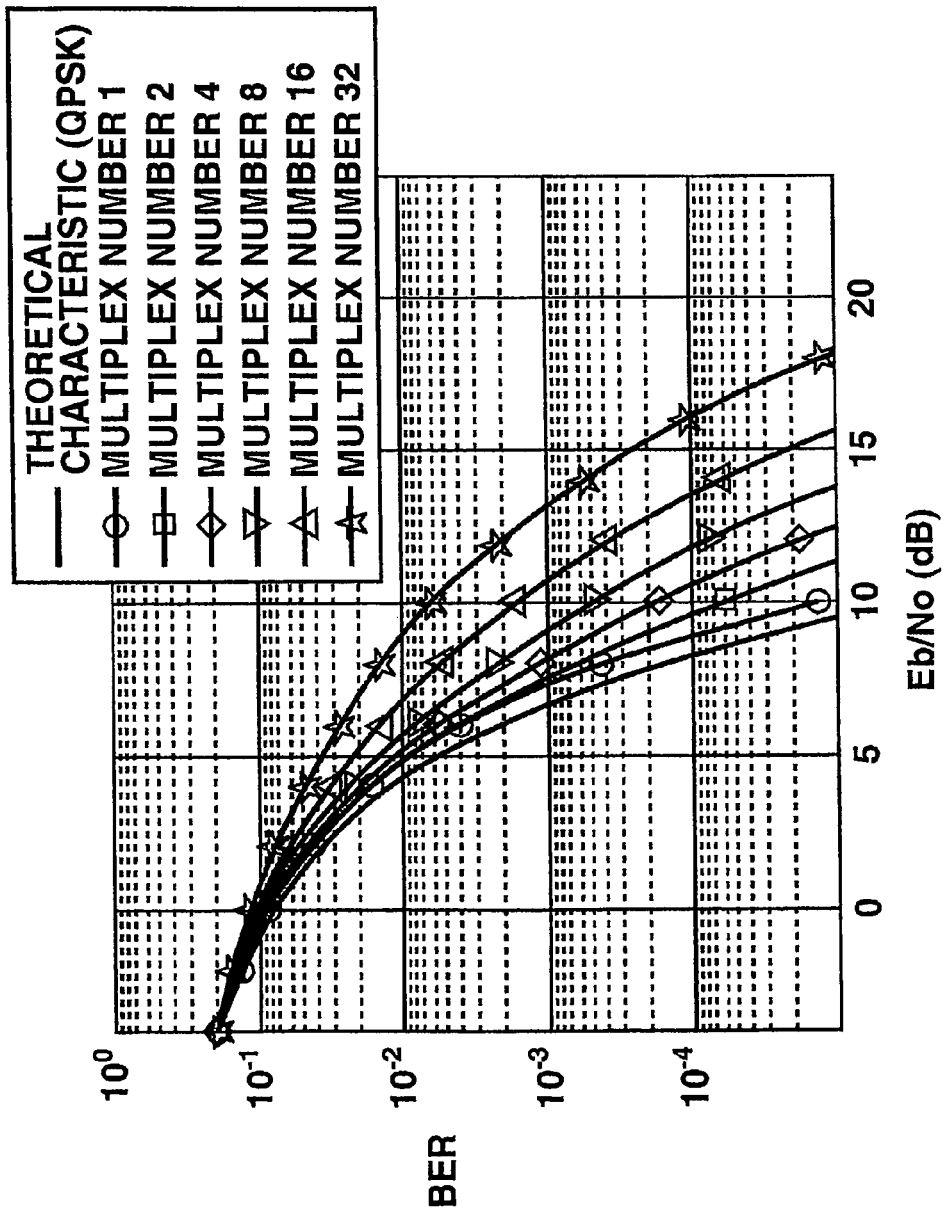

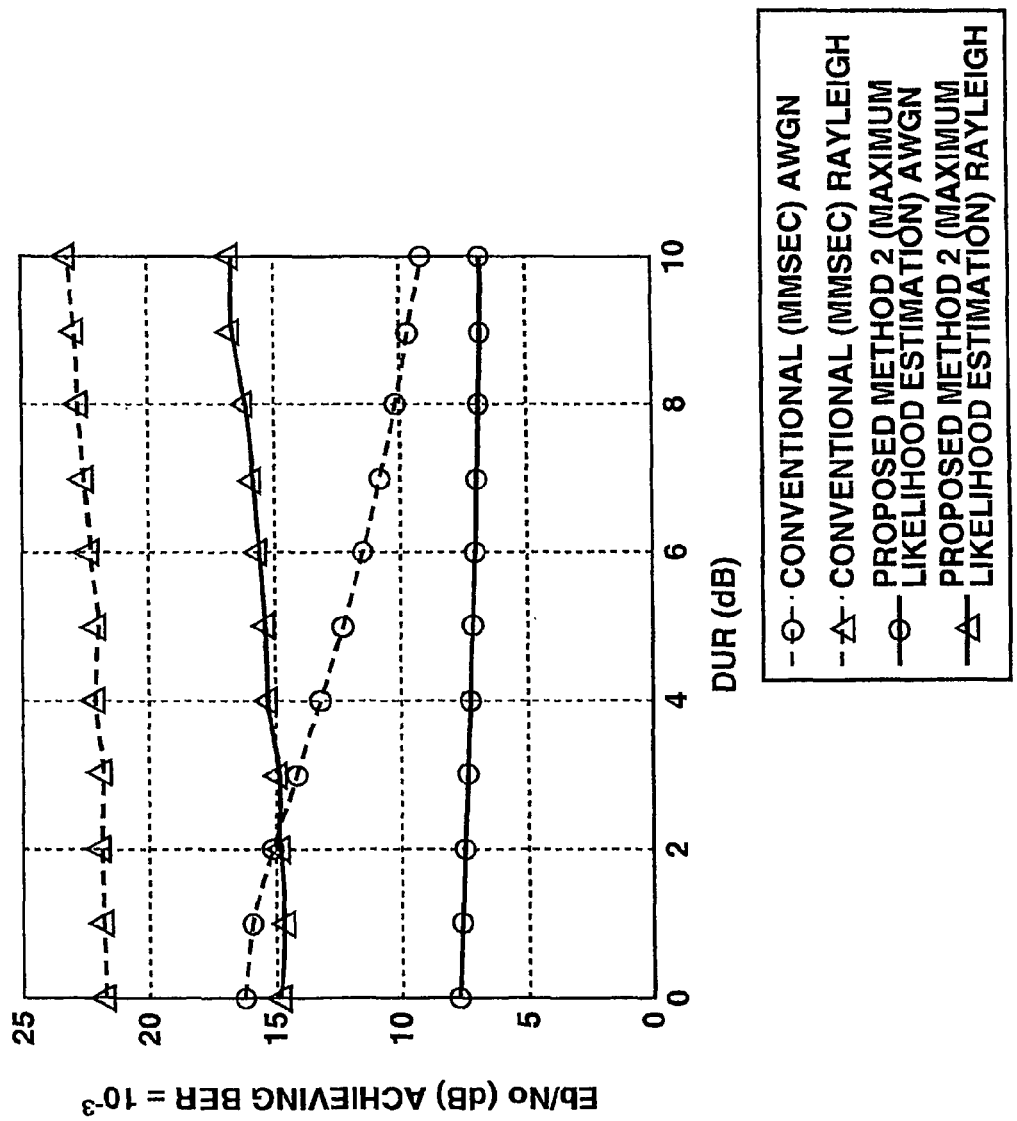

MC-CDMA SYSTEM, TRANSMITTER AND RECEIVER

BACKGROUND OF THE INVENTION

1. Field of the Invention

The present invention relates to a transmitter and a receiver, which are used for an MC-CDMA system based on a multi-carrier CDMA (hereinafter referred to as MC-CDMA) method.

2. Description of the Related Art

In a mobile radio communication, attention is focused, as an ultra-high speed radio access technology in a frequency selectivity fading environment, to the MC-CDMA system which results from the merging of the OFDM method and the CDMA method. This system is a system in which to transmit a transmitting signal, it is multiplied by the code sequence, proper to each user, in a frequency domain to be spread and split into a plurality of subcarriers (see "Application of OFDM Modulation Method", written by Wataru Matsumoto and Hideki Ochiai, Triceps Corporation, 2001).

A conventional configuration containing a transmitter and a receiver in this system is shown in FIG. 4.

In FIG. 4, $d^{(k)}$ represents the data of a user k. At this time point, the data is digital data. Each QPSK modulator part receives data of 2 bits and output the data in a form of one symbol. Each copy part copies the data by a spreading ratio on the frequency axis. L represents spreading ratio. The copying operation is performed the number of times corresponding to the number of spreading codes. $C_{m,k}$ represents a spreading code of the m-th subcarrier of a k-th user. The spreading code used is the Walsh spreading code shown in FIG. 1. $C_{m,k}$ indicates a spreading code at the m row and the k column in FIG. 1. Each multiplexing part multiplexes spreaded signal of users. A pilot symbol insertion part inserts a pilot symbol for checking conditions of a propagation path in a demodulator side to the output signal from the multiplexing part. Generally, when transmission data is restored into its original data, even if the process in the transmission side is reversely executed, the data is not restored to the original one since the data has undergone the delay and the fading phenamenon. To cope with this, a known pilot symbol is inserted, and the receiving side estimates conditions of the propagation path on the basis of the pilot symbol received. And, the receiving side demodulates the receiving data by using the estimated information (the delay profile and the frequency response of the propagation path). An IFF (Inverse Fast Fourier Transform) part performs the IFFT to convert the frequency spectrum to a time signal. A guard interval addition part is provided for taking a measure for delay waves, and prevents the previous symbol from entering the sample when the demodulation side performs the FFT (fast Fourier transform). With provision of the guard interval, when delay occurs, the trailing part of a signal is located at the leading part of the signal. From this, it is recognized that the signal has been cyclically shifted by the delay. In the receiving side, the guard interval addition part removes the guard interval from the receiving data and executes the FFT process to converts the time signal to the frequency spectrum. The receiver extracts the pilot symbol for estimation from the spectrum, and a propagation path estimation part estimates a frequency response $h_m$ of the propagation path on the basis of the extracted pilot symbol and a reception pilot symbol. Then, a weight factor computing part weights a spreading code $C_{m,k}$ and frequency response $h_m$, to obtain the k-th user and a weighting factor $G_{k,m}$ of the m-th subcarrier, and to convert one symbol that is input in the QPSK modulator part into 2-bit data.

In the MC-CDMA system thus constructed, the Walsh code has been used for the spreading code. Where such a spreading signal is used, however, when it receives the influence of the delay wave, the spreading codes of the users lose their orthogonality. Its influence affects plural users, and the error rate characteristic is deteriorated. To cope with this, there are proposed an orthogonality restoring combining (ORC) method which uses for composition the weight factors at the time of demodulation, and a minimum mean square error combining (MMSEC) method. And it is confirmed that those proposals are effective for the measure (see, N. Yee, and J P. Linnartz," Controlled Equalization of Multicarrier CDMA In Indoor Rician Fading Channel", "Proc. IEEE VTC" 94, pp. 1665-1669, 1994; A. Chouly, A. Brajal, and S. Jourdan, "Orthogonal multicarrier techniques applied to direct sequence spread spectrum CDMA systems," Proc. IEEE GLOBECOM, '93, pp 1723-1728, September 1999; and S. Hara and R. Prasad, "Design and Performance of Multicarrier CDMA systems in Frequency-Selective Rayleigh Fading Channels", "IEEE Trans. Veh. Technol., Vol. 48, pp 1584-1595, September 1999).

Also in such methods, however, in case where the multiplex number increases, it is impossible to completely keep orthogonality, and the BER characteristic is deteriorated by the inter-channel interference.

SUMMARY OF THE INVENTION

Accordingly, an object of the present invention is to provide an MC-CDMA transmitter and an MC-CDMA receiver, each of which uses novel orthogonal spreading codes which cause the effect of the delay wave to appear in only a specific user.

To solve the above problems, a transmitter multiplies a sinusoidal signal, which, in a frequency domain, has an amplitude of r and is orthogonal as a result that the frequency periods are different among users by the real part component and the imaginary part component of a transmitting signal to be spread and split into orthogonal sub-carriers thereby to multiplex the sub-carriers, and transmits the multiplexed one.

Also in a receiving side, a receiver receives a transmitting signal from the transmitter in a manner that a sinusoidal signal, which has an amplitude of r and is orthogonal as a result that the frequency periods are different among users, is multiplied by the receiving signal in a frequency domain, and the resultant is inversely spread.

For the spreading code, a spreading code is coincident with another spreading code with respect to a delay time of a delay wave.

By so doing, the delay wave affects only the user corresponding to a delay time thereof. In case where the multiplex number is small, the inter-channel interference is eliminated by changing the data arrangement. Also in case where the multiplexer number is large, it is possible to make the likelihood estimation by using the viterbi algorithm.

In the invention thus constructed, in the transmitter side, a spreading process and a multiplexing process are carried out by using an inverse Fourier transform such as IFFT. In the receiving side, an despreading process is carried out by using a Fourier transform such as FFT.

By so doing, the spreading process and the multiplexing process, which are separately performed in the transmitting side, can be processed in batch by the FFT. In the receiving side, where the conventional technology is used, to extract data, the receiving signal must correlate with each spreading code. However, in the invention, the receiving data can be extracted in batch by the FFT. This simplifies the process.

Further, a spreading process and a multiplexing process are carried out by using an inverse Fourier transform, and then the sub-carriers are shifted in phase by using a phase mask. In connection with this, also in the receiver side, the phase of each sub-carriers is reset by using a phase mask, and then the resultant is inversely spread by a Fourier transform.

When the spreading process and the multiplexing process are carried out by using an inverse Fourier transform, and then inversely Fourier transformed, the resultant data is the not spread data of which the order of the data is merely changed. On the other hand, if the sub-carriers are shifted in phase by using a phase mask, and inversely Fourier transformed, the signal at the time of transmission is spread in time. And, if in the receiver side, the phases of the sub-carriers are reset by a known phase mask, the transmitting signal is restored to its original state.

An MC-CDMA system of the invention includes: a transmitter which multiplies a transmitting signal by a sinusoidal signal, which has an amplitude of r and is orthogonal as a result that the frequency periods are different among users, in a frequency domain to be spread and split into orthogonal sub-carriers, and multiplexes the sub-carriers; and a receiver for receiving a transmitting signal from the transmitter in a manner that a sinusoidal signal, which has an amplitude of r and is orthogonal as a result that the frequency periods are different among users, is multiplied by the transmitting signal in a frequency domain, and the resultant is despread. The delay wave affects only the user corresponding to a delay time thereof. In case where the multiplex number is small, the inter-channel interference is eliminated by changing the data arrangement. Also in case where the multiplexer number is large, it is possible to make the maximum likelihood estimation by using the viterbi algorithm.

Further objects, features and advantages of the present invention will become apparent from the following description of the preferred embodiments (with reference to the attached drawings).

BRIEF DESCRIPTION OF THE DRAWINGS

FIG. 1 is a table showing Walsh codes used in a conventional MC-CDMA system;

FIG. 2 is a table showing a group of orthogonal spreading codes used for an MC-CDMA system according to the present invention;

FIG. 3 shows real part components and imaginary part components of the orthogonal spreading codes in the embodiment;

FIG. 5 is a block diagram showing configurations of a transmitter and a receiver in an MC-CDMA system which is an embodiment of the present invention;

DESCRIPTION OF THE PREFERRED EMBODIMENTS

An embodiment of the present invention will be described below with reference to the accompanying drawings.

FIG. 5 shows a configuration of an MC-CDMA system containing an MC-CDMA transmitter and an MC-CDMA receiver, which is an embodiment of the present invention. FIG. 2 is a table showing a group of orthogonal spreading codes used in the embodiment. FIG. 3 shows phases and amplitudes of the orthogonal spreading codes.

Where spreading ratio L is 32, L=32, a group of orthogonal spreading codes, which is one of the features of the embodiment, as shown in FIG. 3, are generated on the basis of an orthogonal relation such as a sine wave or a cosine wave (hereinafter referred to as a sinusoidal wave). The orthogonal spreading code group is generated on the basis of this nature. Assuming that a frequency interval of each sub-carrier is $\Delta f$, and frequency Fm of the m-th sub-carrier is $m\Delta f$, $F_m = m\Delta f$ (m=0, 1, ..., L−1), a spreading code sequence of a user k (k=0, 1, ..., k−1: k=number of users) is expressed by $$c^{(k)}(f_m) = c^{(0)}(f_m) e^{j2\pi \frac{m \cdot k}{L}} \quad \text{(Equation 1)}$$

Assuming that $c^{(0)}(f_m)=1$, we have $$c^{(k)}(f_m) = e^{j2\pi \frac{m \cdot k}{L}} \quad \text{(Equation 2)}$$

This equation expresses the spreading code sequence. The correlation of the proposed orthogonal spreading code group is 0 and the correlation among the users is 0. Therefore, orthogonality among the users can be obtained.

The Walsh code in the conventional system is a binary series of (−1,1). To spread the signal by using this code means "to arrange the data, which is copied by the spreading ratio, on the frequency axis, and to phase shift the data by (0, π). In this case, the phase of the signal is varied, but the amplitude remains unchanged. Accordingly, its spectrum takes a rectangular shape. In this connection, when the signal by the proposed orthogonal code is spread, the phase of a signal is varied since the real part component and the imaginary part component of the signal are sinusoidal signals. However, the spectrum is rectangular in shape as in the case of spreading using the Walsh code since the amplitude of the signal is fixed.

Figure 4:
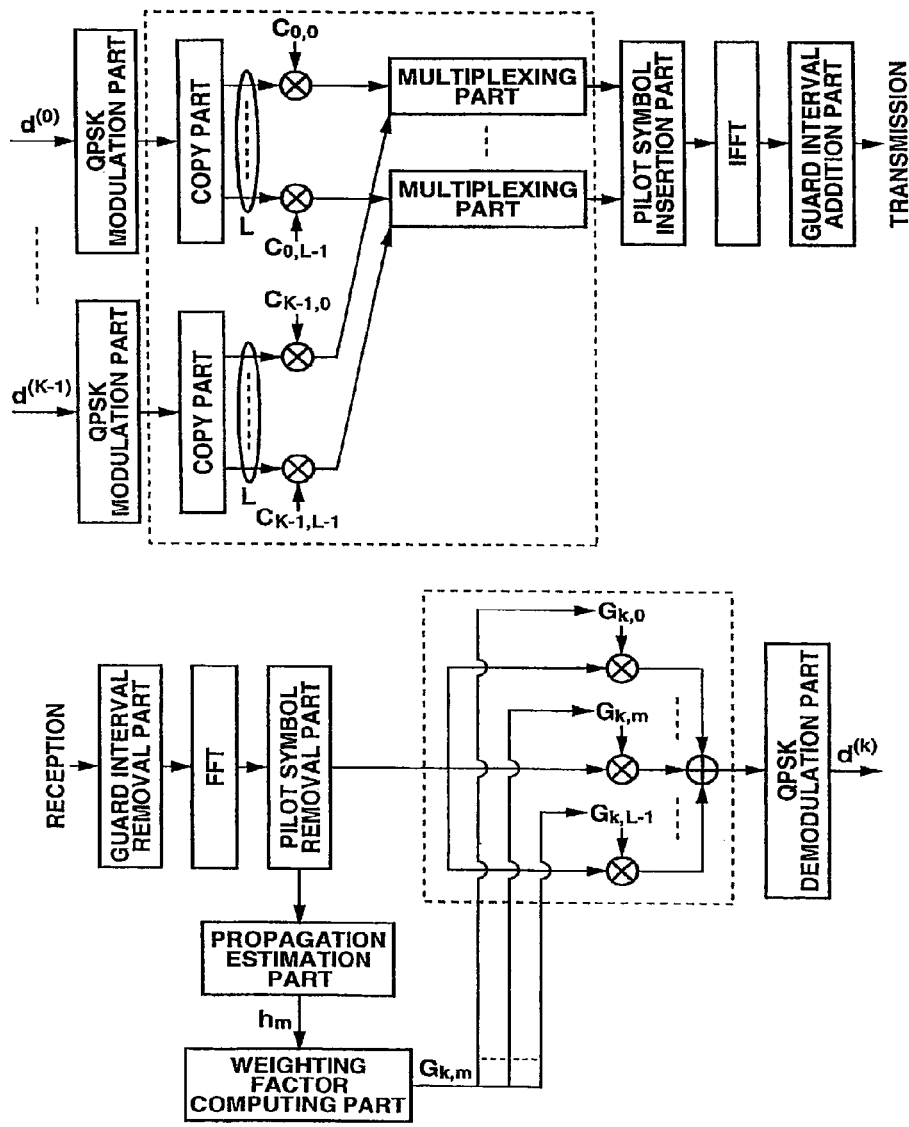
FIG. 4 is a diagram showing a transmitter of a conventional MC-CDMA system.

In the configuration of the transmitter in the conventional MC-CDMA system shown in FIG. 4, data is copied by the spreading ratio, the data is multiplied by the spreading codes proper to users, and then the spread data of all the users are multiplexed. When the proposed orthogonal code is used, a multiplexed sub-carrier signal is expressed by the following equation $$S(f_m) = \sum_{k=0}^{K-1} d^{(k)} \exp\left(j2\pi \frac{m \cdot k}{L}\right) \quad \text{(Equation 3)}$$

In the above equation, d(k) represents the data of a user k. The equation is equivalent to an inverse discrete Fourier transform (IDFT) equation when a discrete time signal is Vs(t) and a discrete frequency spectrum is Vs(f).

$$v_s(t) = \sum_{f=0}^{\infty} V_s(f) \exp(j2\pi ft) \quad \text{(Equation 4)}$$

Therefore, a process for spreading and multiplexing the sub-carriers by using the proposed orthogonal code may be replaced with the IDFT, and the IFFT as a fast process of the former. In FIG. 4 showing the conventional MC-CDMA system, a block enclosed by a dotted line in the transmitter side is replaced with the IFFT. A problem resides when the spreading/multiplexing method is used. Where this method is used, the IFFT is performed successively two times at the time of transmission.

The discrete Fourier transform is expressed by the following equation.

$$V_s(f) = \sum_{t=0}^{\infty} v_s(t) \exp(-j2\pi ft) \quad \text{(Equation 5)}$$

If f=−f', then the equation 5 becomes $$V_s(-f') = \sum_{t=0}^{\infty} v_s(t) \exp(j2\pi f't) \quad \text{(Equation 6)}$$

As seen, the difference between the IDFT and the DFT is the fact that the sign of the computing result is reversed. Therefore, if the IFFT as a fast process of the IDFT is performed two times, an MC-CDMA signal is obtained in which the user data is merely changed in time order. Such a signal produces no spreading effect.

To cope with this, the IFFT is executed in place of the spreading/multiplexing process. Then, the phases of the sub-carriers are made random by a phase mask before the IFFT is performed. The phase mask has a fixed amplitude and a random phase, and must be known in the transmitter and the receiver. This phase mask may be used as a code to distinguish it adjacent cells. When the phase mask is used, the MC-CDMA signal, when sent, is spread also in time. A configuration of a transmitter and a receiver in the MC-CDMA system, which uses the proposed spreading/multiplexing method and the phase mask, is shown in FIG. 5.

In FIG. 5, $d^{(k)}$ indicates the data of a user k. The data is digital data formed by splitting a serial data sequence into blocks.

A QPSK modulator part receives 2-bit data and outputs it in the form of a single symbol.

The transmitter under discussion is different from that in the conventional system (FIG. 4) in that the portion enclosed by a dotted line in the transmitter in FIG. 4 is substituted by an IFFT part and a phase shift part. In case where the proposed spreading code is used, the process of copying the data by the spreading ratio, and multiplying those by the spreading code to multiplex them is substituted by the IFFT process. The IFFT converts the spectrum to a time signal. This operation is to superimpose data on waves having different frequencies and to add them. This is just equivalent to the process of spreading the signal by the proposed spreading code.

The phase shift processing part shifts amplitude/phase information of the sub-carrier processed by the IFFT by an arbitrary value by means of a phase mask. The phase mask is such that an amplitude of it is invariable, and the phase is set at random value and is multiplied by each sub-carrier. In this way, the phases of the sub-carriers are varied, and then the second IFFT is performed. The next IFFT converts a signal output from the phase shift processing part from the frequency domain to a time domain. A pilot symbol insertion part, like the conventional one, inserts a pilot symbol for checking conditions of the propagation path in the demodulation side to the output signal.

A guard interval addition part, like the conventional one, is provided for the delay wave measure. When the FFT is performed in the demodulation side, the guard interval addition part, prevents a previous symbol from entering the sample. With provision of the guard interval, when delay occurs, the trailing part of a signal is located at the leading part of the signal. From this, it is recognized that the signal has been cyclically shifted by the delay.

On the other hand, the receiver receives a signal coming from the transmitter. A guard interval removal part removes the guard interval, and an FFT converts the signal in the time domain to a signal representing the spectrum in the frequency domain. A pilot symbol removal part extracts a pilot symbol for delay estimation and obtains a correlation by using a known transmission pilot symbol and a reception pilot symbol to thereby obtain $\rho_{kk}$ and $\alpha \rho_{kk}$. The spectrum from which the pilot symbol has been removed is multiplied by the phase mask which is used in the transmission side, whereby it is restored into its original state. Further, the next FFT processes the despreading. A pilot symbol thus obtained is used as a temporary determination symbol. The maximum likelihood estimation based the viterbi algorithm is performed by using $\rho_{kk}$ and $\alpha \rho_{kk}$, thereby obtaining the demodulated data $d_r^{(k)}$ of the user k.

Description is given about a relationship between the proposed orthogonal spreading code. One of the greatest features of the proposed orthogonal spreading code is that the inter-channel interference, which arises from the delay wave, is confined only to the spreading code of a specific user. In case where a delay wave is present, and amplitude of one delay wave is $\alpha$ and a delay time is M samples, the channel characteristic in the frequency region is given by $$h_m = \alpha e^{-j2\pi \frac{m \cdot M}{L}} \quad \text{(Equation 7)}$$

A delay wave component of a code $C^{(k+M)}$ allotted to a user k+M varies as expressed by $$\begin{aligned} \alpha C^{(k+M)} \cdot h_m &= e^{j2\pi \frac{m \cdot (k+M)}{L}} \cdot \alpha e^{-j2\pi \frac{m \cdot M}{L}} \\ &= \alpha e^{j2\pi \frac{m \cdot k}{L}} \\ &= \alpha C^{(k)} \end{aligned} \quad \text{(Equation 8)}$$

Figure 6:
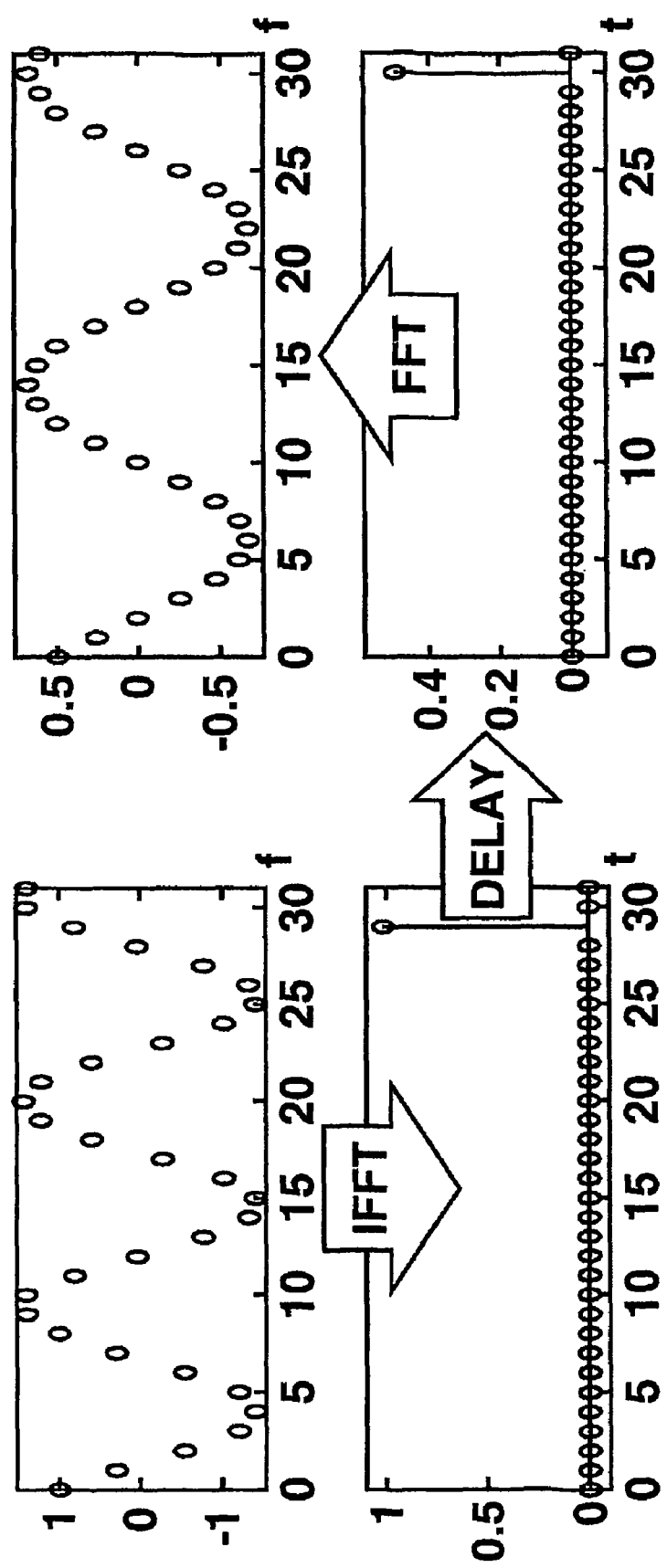
FIG. 6 is a diagram showing relationships between the spreading codes and delays in the embodiment.

A relationship between the spreading codes of users 3 and 2 when a delay wave having a delay time of one sample is present is shown in FIG. 6, by way of example. As seen from the figure, a delay wave component of the spreading code of the user 3 has the same pattern as the spreading code pattern of the user 2. This is true for all the codes. The delay wave component of the spreading code of a user k+1 has the same pattern as a spreading code pattern of a user k. If the delay time of the delay wave is M samples, the delay wave component of the spreading code of a user k+M has the same pattern as a spreading code pattern of a user k.

Description is given about a measure taken for the inter-channel interference, which is caused by a delay wave when this proposed orthogonal spreading code group is used.

In an MC-CDMA multiplexing environment, a symbol is composed by correlating a receiving signal R with a spreading code $C^{(k)}$, and hence, a demodulation symbol $d_r^{(k)}$ of the user k is given by $$d_r^{(k)} = \sum_{m=0}^{L-1} RC^{(k)*} = d^{(k)}\rho_{kk} + Z_n \quad \text{(Equation 9)}$$

In the equation, L is a spreading factor, $\rho_{kk}$ is an autocorrelation value of the spreading code $C^{(k)}$, and $Z_n$ is Gaussian noise. This is a demodulation symbol when no influence by the delay wave is present. When the signal is affected by the interference by the delay wave (its amplitude is α, and its delay time is M samples), a spreading code which affects the demodulation symbol $d_r^{(k)}$ of the user k when the proposed orthogonal spreading code is used is only the code of the use k+M. The demodulation symbol $d_r^{(k)}$ is given by $$d_r^{(k)} = d^{(k)}\rho_{kk} + d^{(k+M)}\alpha\rho_{kk} + Z_n \quad \text{(Equation 10)}$$

Where the conventional Walsh code is used, the signal is affected by the influence of one delay wave to interfere with a plurality of spreading codes. With use of the proposed orthogonal spreading code having the nature expressed by the equation 10, the spreading code affected by the delay wave is limited to a specific one. Two methods making use of such a nature will be described. A first method is a spreading code select method when the number of users is small, and a second method is a multi-user estimating method using the viterbi algorithm when the number of users is large.

<Proposed Method 1>

A method of selecting a spreading code when the number of users is small will first be described. By using the proposed orthogonal spreading code, the interference by the delay wave component appears in only the spreading code based on the delay time. In other words, by selecting the spreading code so as to be less affected by the delay wave influence, the delay wave influence is lessened. Assuming that n=natural number, and k'=nk (k=1, 2, . . . , L−1), the proposed orthogonal spreading code sequence is expressed by the following equation $$c^{(k')}(f_m) = e^{j2\pi \frac{m \cdot k'}{L}} \quad \text{(Equation 11)}$$

In this case, the signal is affected by the interference by the delay wave having a delay of nk samples. The number of simultaneously connected users decreases to L/n. When the spreading/multiplexing process is replaced with the IFFT, an equivalent measure may be taken if the data of the users are rearranged so that the IFFT point is taken every n points.

Figure 7:
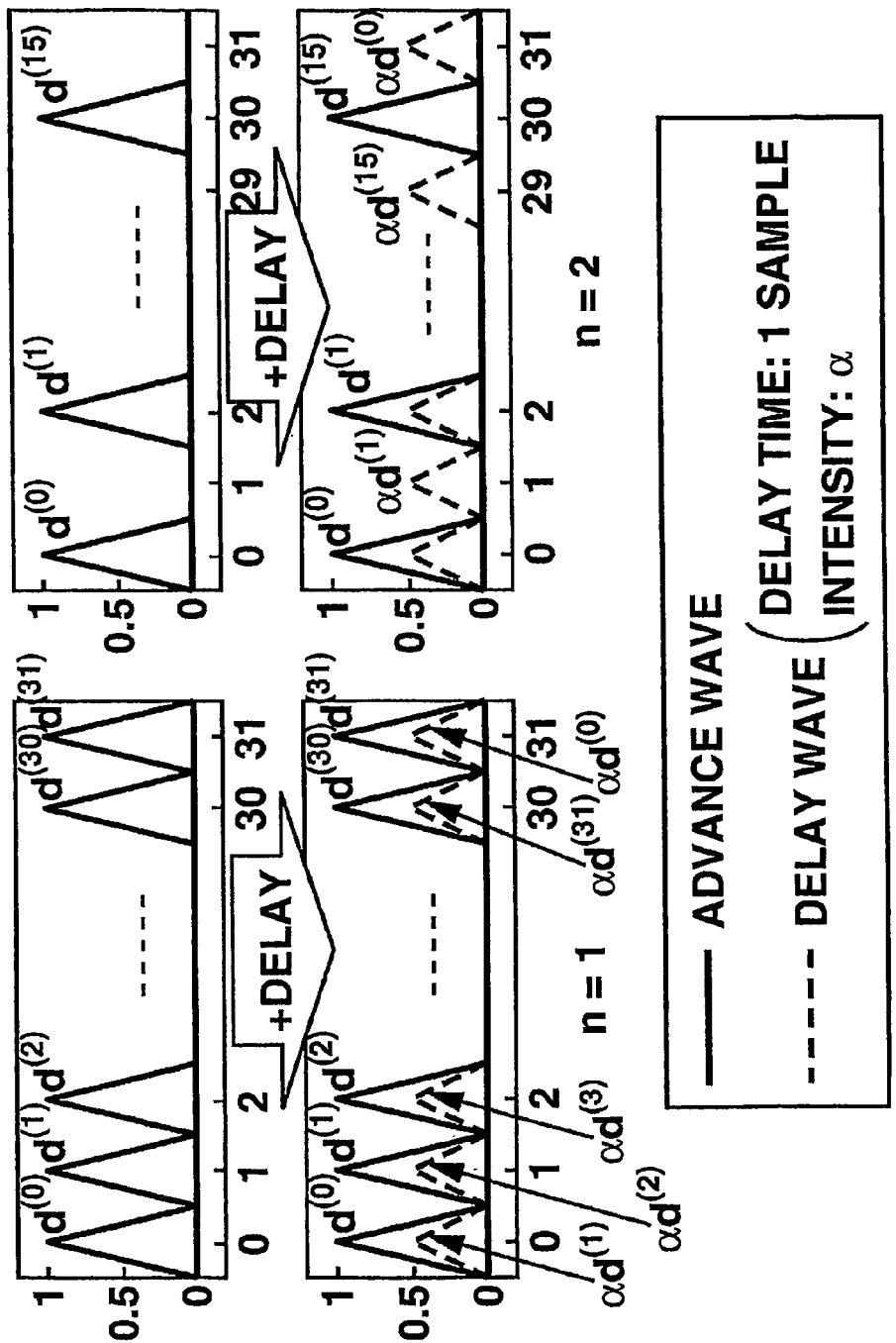
FIG. 7 is a diagram showing a data arrangement method in the embodiment.

FIG. 7 shows the inter-channel interference at the time of demodulation when the delay time M is 1 sample, M=1, and n=1 and n=2

<Proposed Method 2>

The multi-user estimating method using the viterbi algorithm when the number of users is large will be described.

If in the equation 10, the demodulation symbol $d_r^{(k)}$ is time sequential, and $\rho_{kk}$ and α $\rho_{kk}$ are an impulse response, the equation 10 may be considered to express the inter-symbol interference. Accordingly, a method like the maximum likelihood sequence estimating method based on the viterbi algorithm is available.

If the demodulation symbol ($d_r^{(0)}$, $d_r^{(1)}$, . . . , $d_r^{(k)}$, . . . , $d_r^{(K-1)}$) is time sequential, a variation of the symbol from $d_r^{(k+M)}$ to $d_r^{(k)}$ is limited to the number of combinations of actual transmission symbols $d^{(k+M)}$ and $d^{(k)}$ by obtaining $\rho_{kk}$ and α $\rho_{kk}$ by using the equation 10.

It is assumed that M (delay time)=1 sample and the modulation method is QPSK. In a case where the demodulation symbol of the use k is 00 ($d^{(k)}$=00) in a state 00 ($\sigma_{n+1}$= $d^{(k+1)}$=00), if 00→1+j, $d^{(k+1)}$=$d^{(k)}$=−1+j. Hence, (−1+j)$\rho_{kk}$+ (−1+j)α $\rho_{kk}$ is a demodulation symbol.

In this way, transient states in the viterbi algorithm are obtained, metric calculations are sequentially performed to determine a surviving path, and a data sequence transmitted is obtained. In performing the metric calculation, it is necessary that the head symbol is known to the receiving side. The number of simultaneously connected users is decreased by 1.

Embodiment 1

A computer simulation will next be described. Simulation dimensions are first shown in Table 1.

TABLE 1

|  | Conventional Method (MMSEC) | Proposed Method 1 | Proposed Method 2 |
| --- | --- | --- | --- |
| Primary modulation | QSPK | | |
| Spreading method | Normal | IFFT | IFFT |
| No. of sub-carriers |  | 32 |  |
| Spreading ratio |  | 32 |  |
| Max. multiplexing number | 32 | 16 | 31 |
| Guard interval length | 15% of symbol length | | |
| Propagation model | 2-wave Rayleigh model (Delay time: 1 sample DUR: 4 dB) | | |
| Symbol sync. | Complete sync. | | |
| Propagation path estimation | By pilot symbol | | |

In the transmission side, the data of the respective users, which are primarily modulated by the QPSK modulator parts, are arranged, the IFFT process is executed in place of the spreading/multiplexing process, the phases of the sub-carriers are set by the phase mask, and a pilot symbol, common to all the users, is inserted. Then, the IFFT is performed to produce an MC-CDMA time signal, and guard interval is inserted into the MC-CDMA time signal. In the receiving side, the guard interval is removed, and the FFT splits the receiving signal onto the frequency axis. The phases of the sub-carriers, which were set by the phase mask, are reset, and the FFT is performed in place of the inverse spread, thereby producing a composed demodulation symbol. This is used as a temporary determination symbol. A delay profile is obtained from a pilot symbol. The synchronous addition is performed several times to obtain the values of the $\rho_{kk}$ and $\alpha \rho_{kk}$. When the number of users in a static environment, the data arrangement of each user at the time of transmission is changed, the temporary determination symbol is directly a receiving symbol. Also in a fading environment, the influence by the delay wave is negligible. However, by correcting only the phase rotation of the direct wave by using $\rho_{kk}$, the receiving symbol is obtained. In a case where the number of users is large, maximum likelihood multi-user detection based on the viterbi algorithm is performed by using the temporary determination symbol and the $\rho_{kk}$ and $\alpha \rho_{kk}$. The symbol output is used as an estimation receiving symbol. BER performance vs. $Eb/N_0$ (ratio of signal power per bit to noise power spectral density after information demodulation) in those cases were calculated by the simulation.

Figure 9:
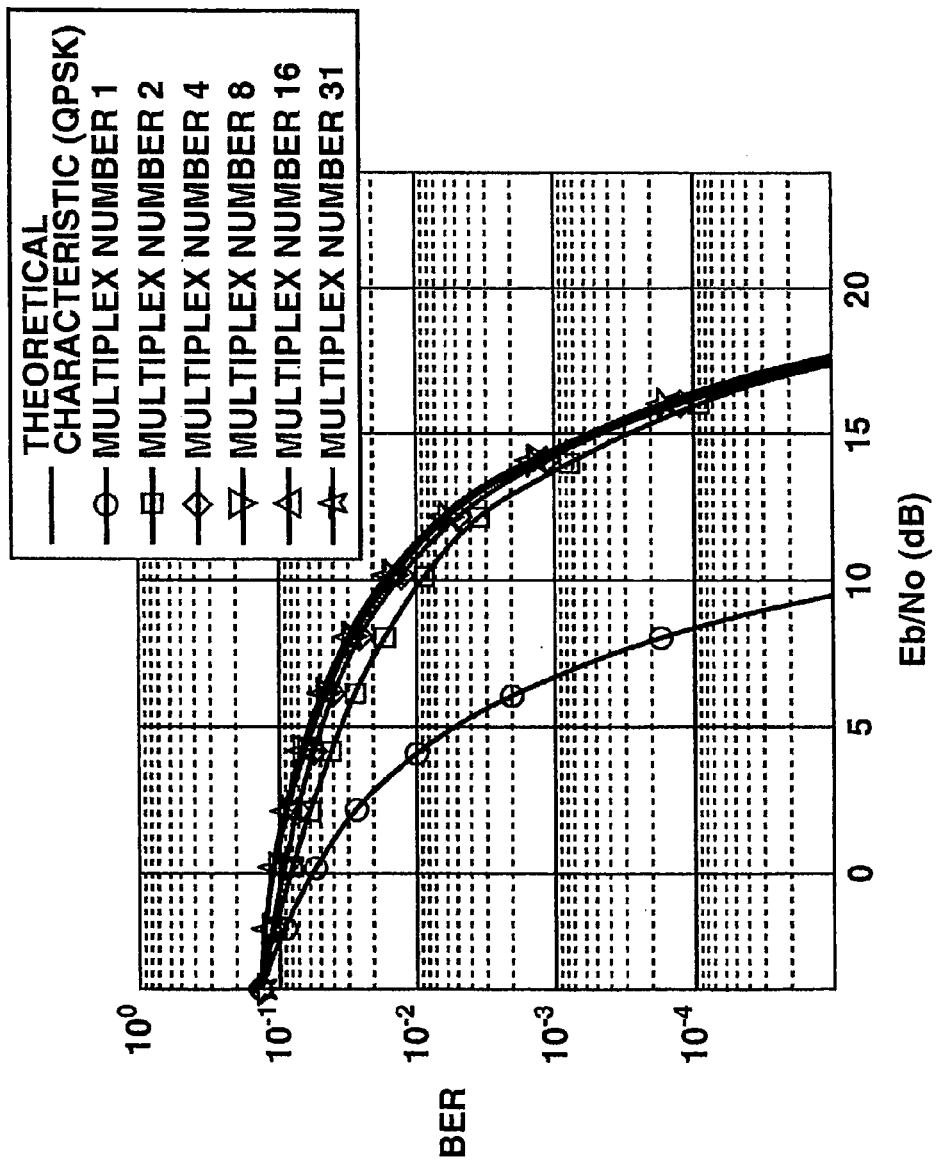
FIG. 9 is a graph showing A BER performance vs. $Eb/N_0$ in a static environment according to the present invention.
Figure 10:
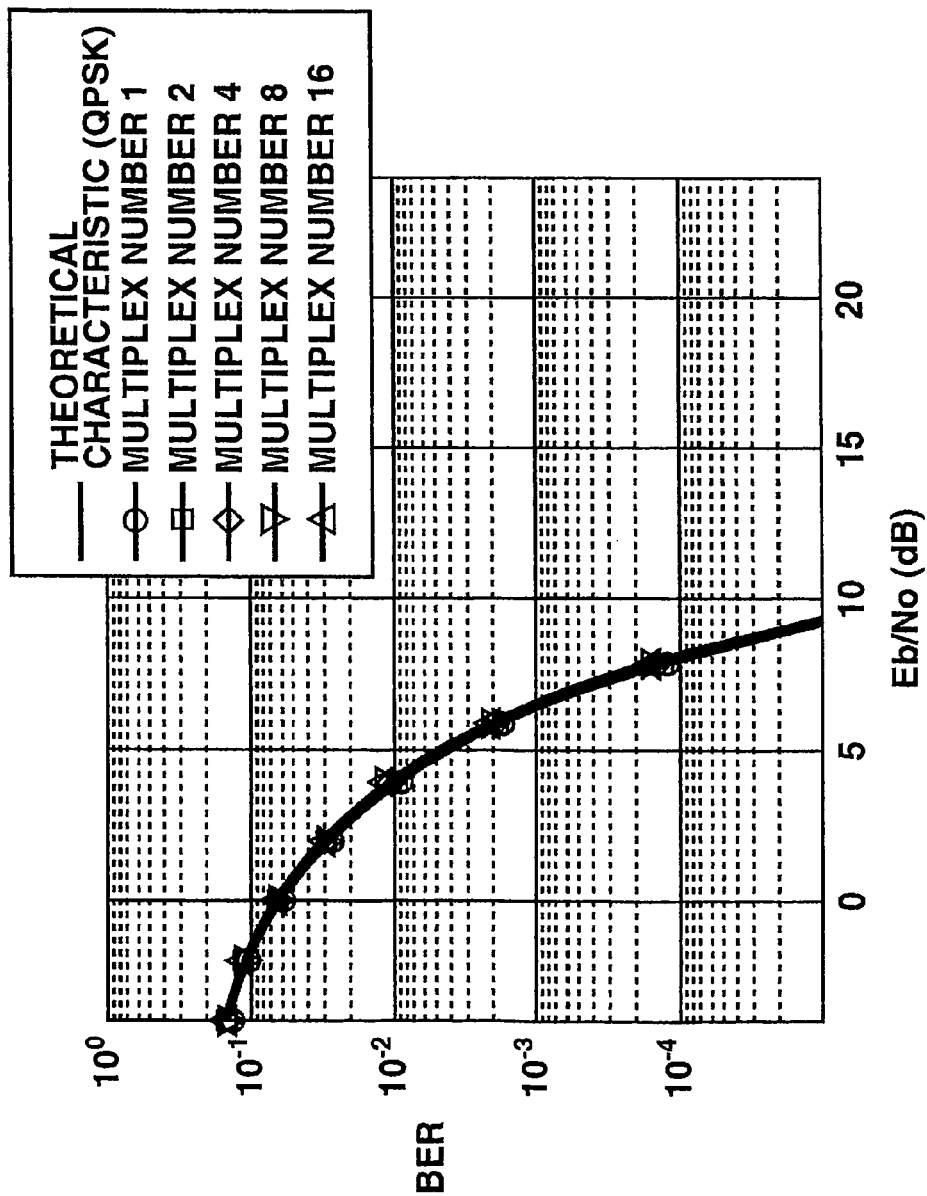
FIG. 10 is a graph showing another BER performance vs. $Eb/N_0$ in a static environment according to the present invention.
Figure 11:
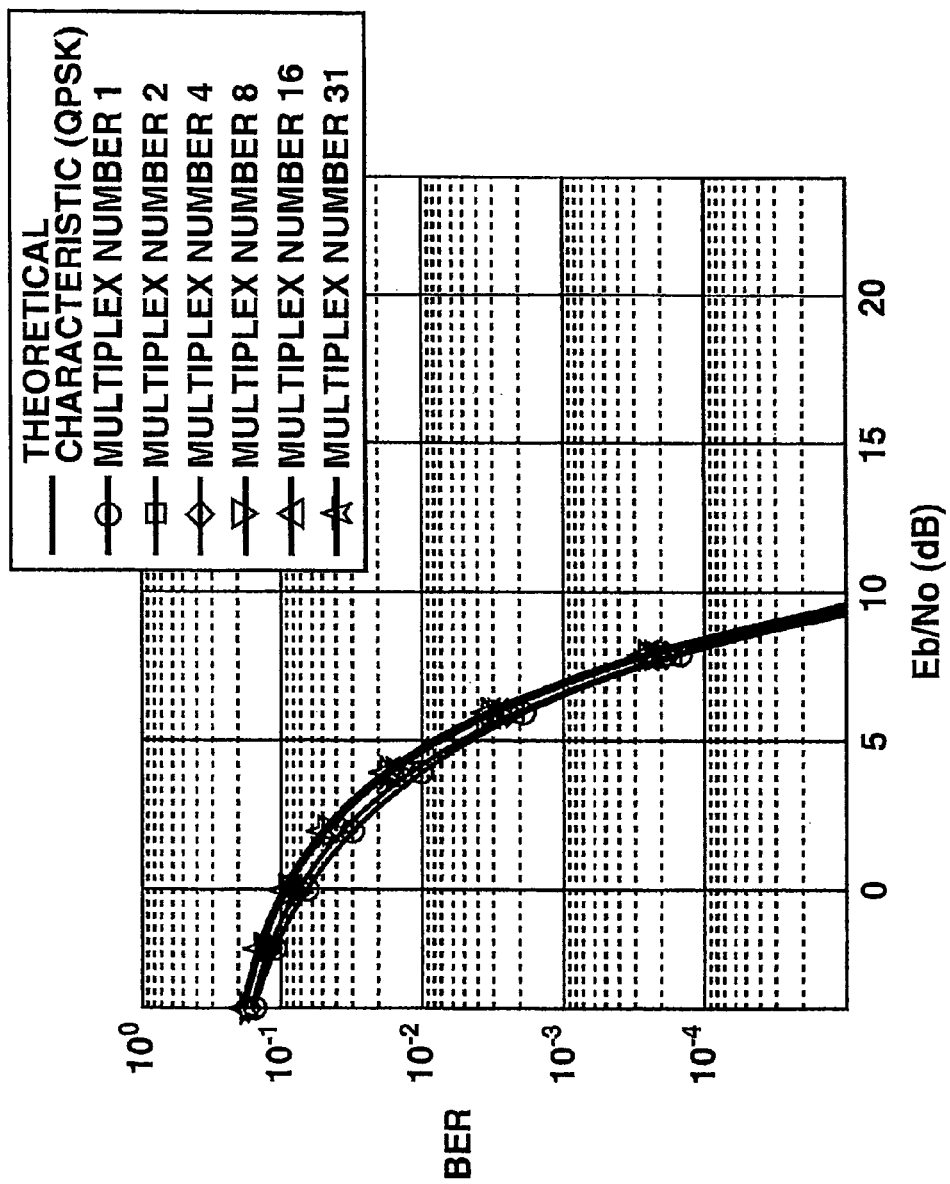
FIG. 11 is a graph showing still another BER performance vs. $Eb/N_0$ in a static environment according to the present invention.
Figure 8:
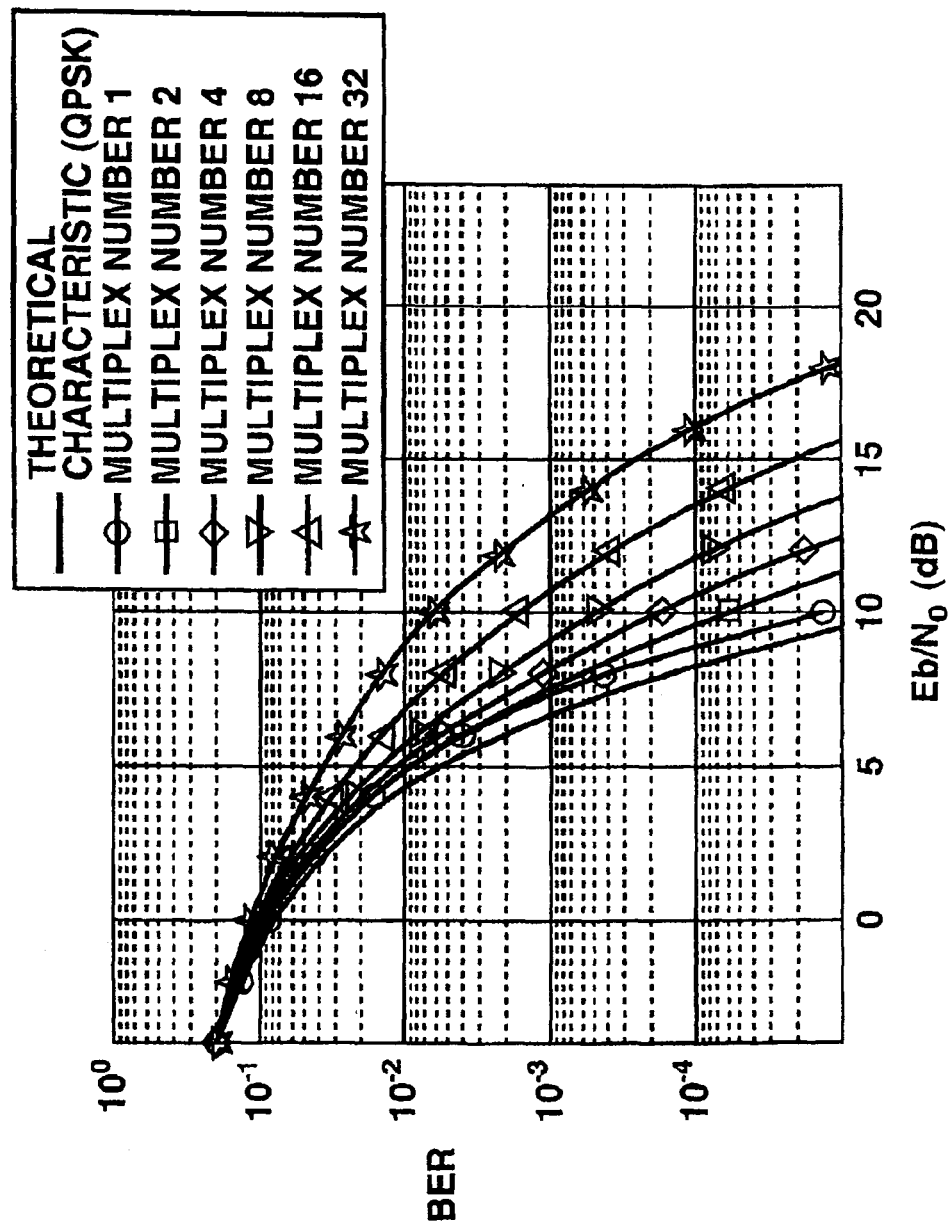
FIG. 8 is a graph showing a conventional BER performance vs. $Eb/N_0$ in a static environment.
Figure 10:
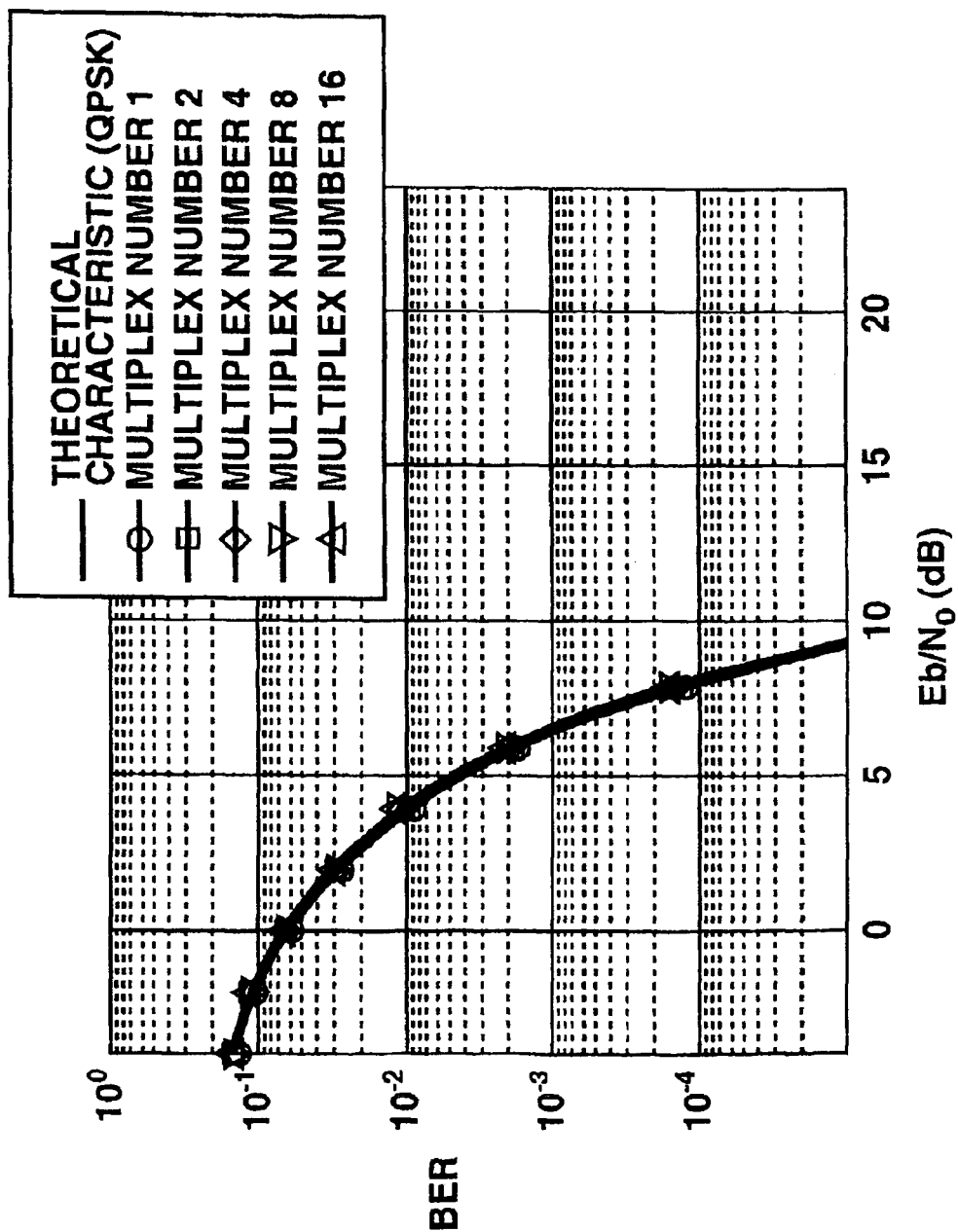

A BER performance vs. $Eb/N_0$ in a static environment when a conventional MMSEC demodulation method is used, is shown in FIG. 8. The simulation for obtaining those characteristics is based on the assumption that a variance of noise, which is used to determine a weighting factor of the MMSEC, is known. A BER performance vs. $Eb/N_0$ in the case of using the proposed spreading/multiplexing method is shown in FIG. 9. In this case, the users based on delay times are directly affected. Accordingly, the BER performance vs. $Eb/N_0$ significantly deteriorates unless any special measure is taken in the demodulation side. A level of the influence is invariable even if the number of users is increased. A BER performance vs. $Eb/N_0$ in case where the data arrangement is changed under the condition of a small number of users, in the proposed method is shown in FIG. 10. As seen from the characteristic, the influence by the delay wave is completely removed. A BER performance vs. $Eb/N_0$ in case where the maximum likelihood multi-user detection based on the viterbi algorithm is performed under the condition of a large number of users is shown in FIG. 11. The figure shows that where the proposed method is used, the BER characteristic little deteriorates even if the number of users increases. It is confirmed that an $Eb/N_0$ ratio at which $BER=10^{-3}$ is achieved when the maximum multiplex number is present, is improved about 6 dB compared to the MMSEC based demodulation method.

Figure 12:
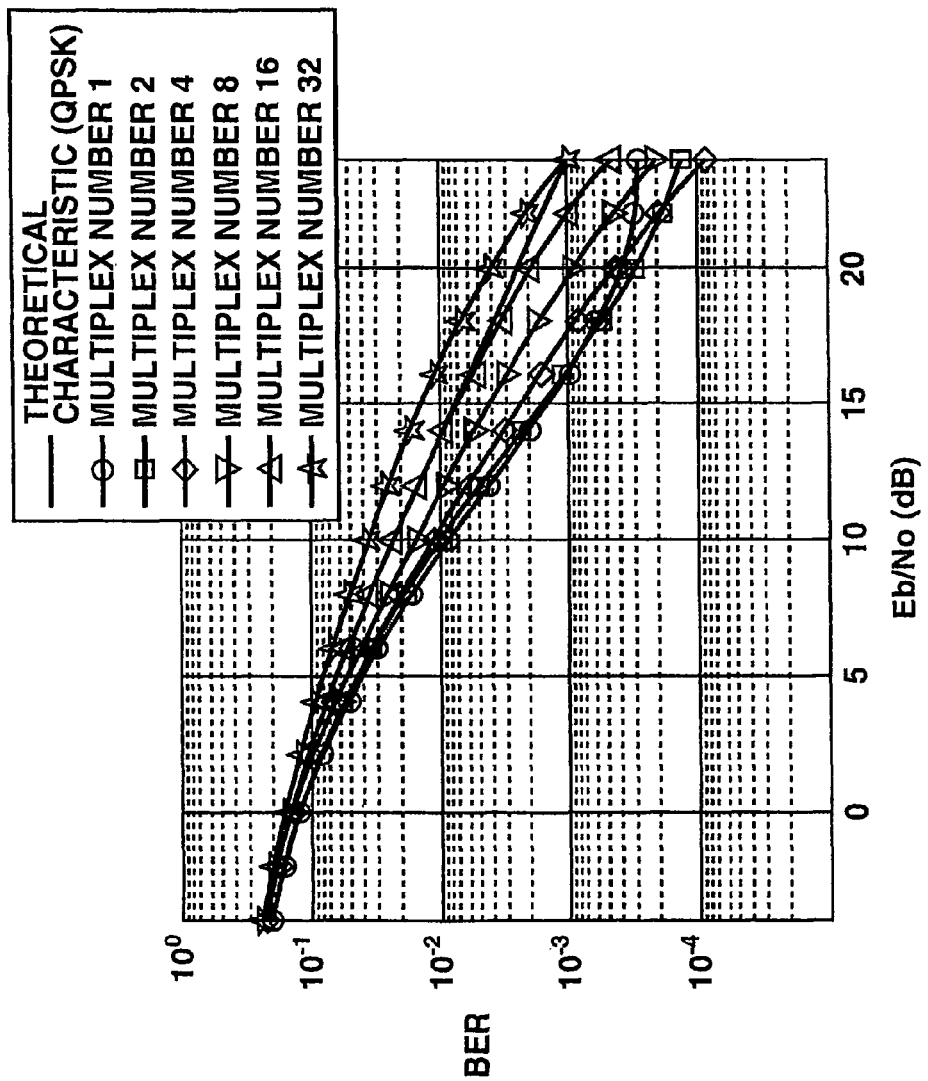
FIG. 12 is a graph showing a conventional BER performance vs. $Eb/N_0$ in a fading environment according to the present invention.
Figure 13:
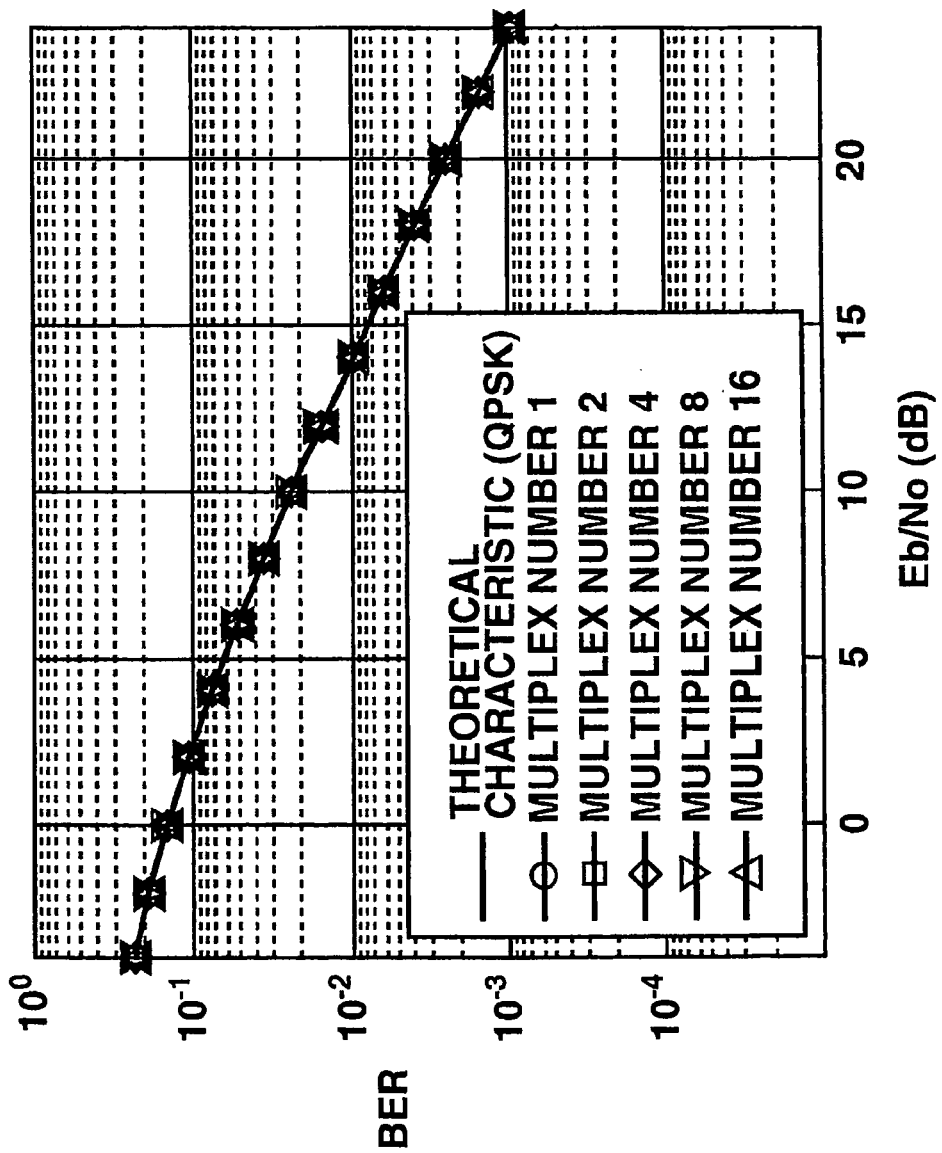
FIG. 13 is a graph showing A BER performance vs. $Eb/N_0$ in a fading environment according to the present invention.
Figure 14:
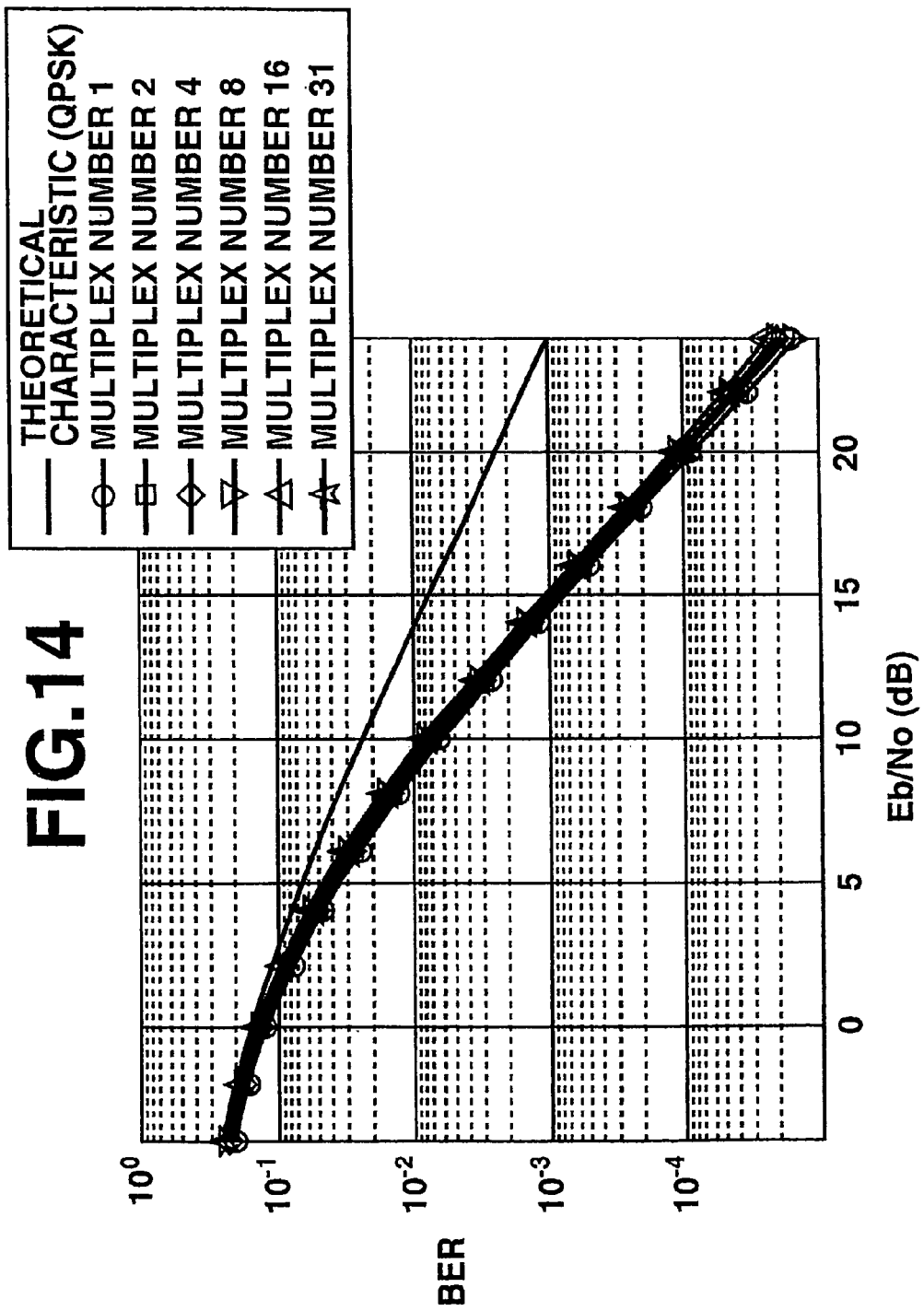
FIG. 14 is a graph showing A BER performance vs. $Eb/N_0$ in a fading environment according to the present invention.

A BER performance vs. $Eb/N_0$ in case where a conventional MMSEC based demodulation method is used in a fading environment is shown in FIG. 12. Also in this simulation, the variance of noise is known in the receiver side. A BER performance vs. $Eb/N_0$ in case where the data arrangement is changed under the condition of a small number of users, in the proposed method is shown in FIG. 13. The characteristic shows that the influence by the delay wave is removed, and no diversity effect by the delay wave is present. A BER performance vs. $Eb/N_0$ in case where the maximum likelihood multi-user detection based on the viterbi algorithm is performed under the condition of a large number of users is shown in FIG. 14. The figure shows that where the proposed method is used, the BER performance little deteriorates even if the number of users increases, as in the previous static environment. Further, since in the fading environment the diversity effect is present, it is confirmed that an $Eb/N_0$ ratio at which $BER=10^{-3}$ is achieved at the maximum multiplex number, is improved as great as about 9 dB, compared to the MMSEC method.

Figure 15:
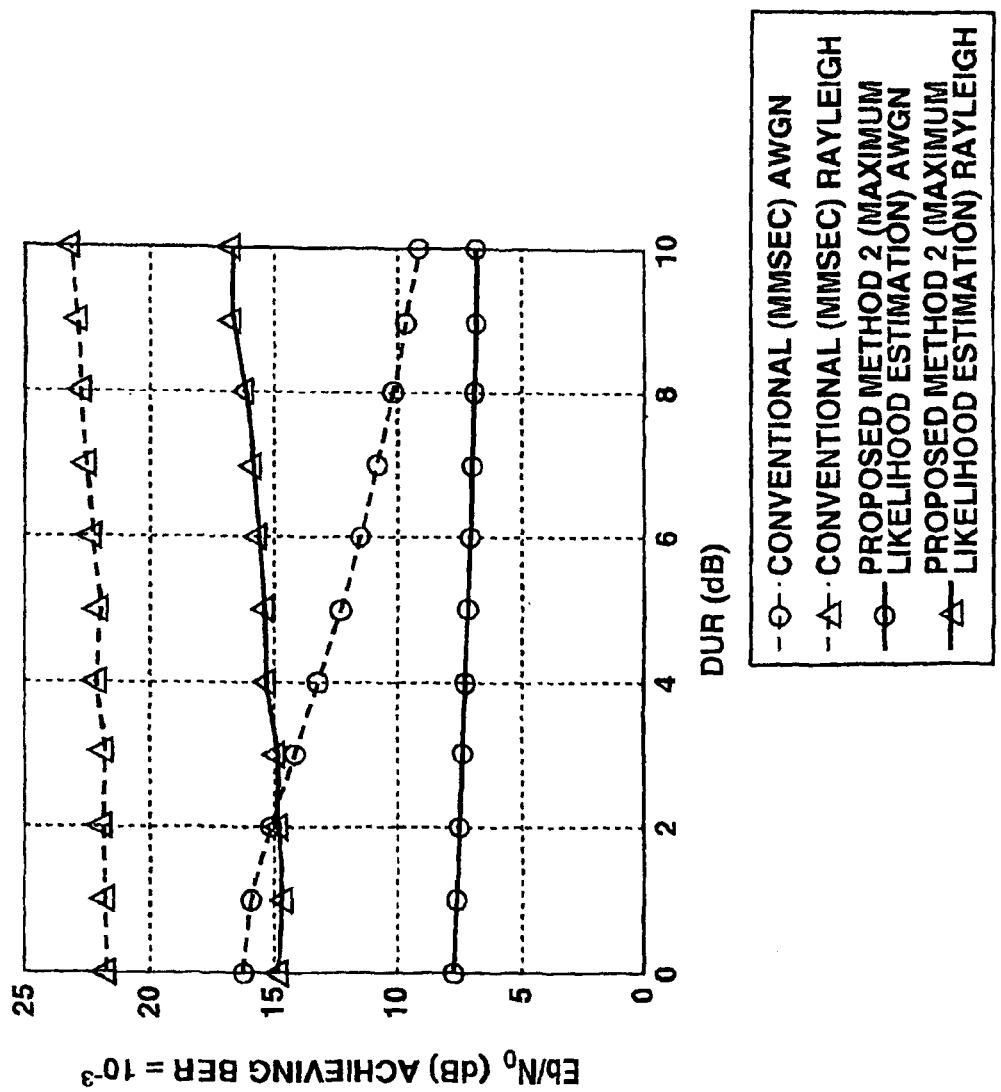
FIG. 15 is a graph showing required $Eb/N_0$ vs. DUR.

A relationship between a DUR as a power ratio of the advance wave and the delay wave and an $Eb/N_0$ ratio at which $BER=10^{-3}$ is achieved when the multiplex number is 16 in each method, is shown in FIG. 15. As seen, in the MMSEC based demodulation in the conventional method, the performance deteriorates with increase of the power of the delay wave in the static environment, while in the proposed method, the characteristic does not depends on the DUR.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

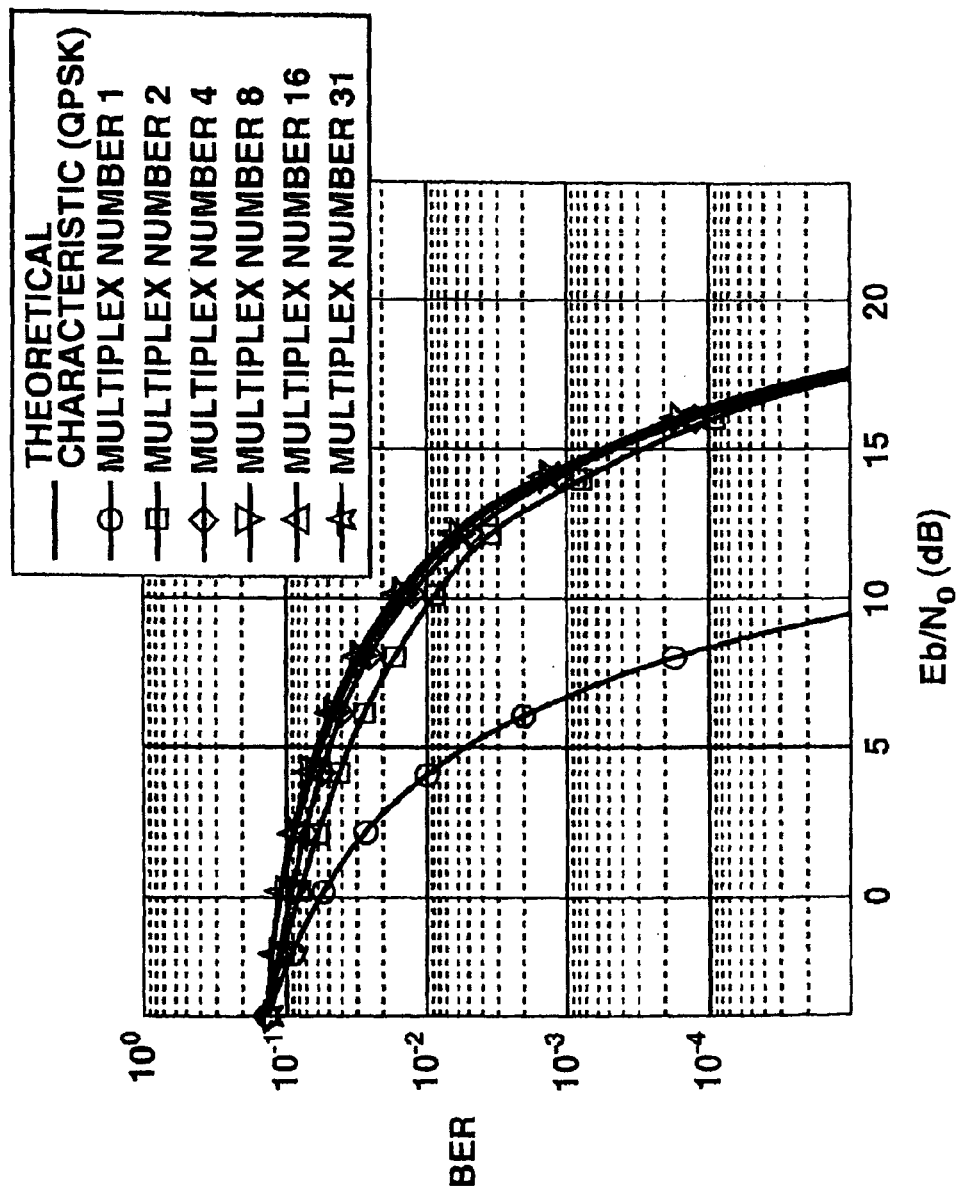

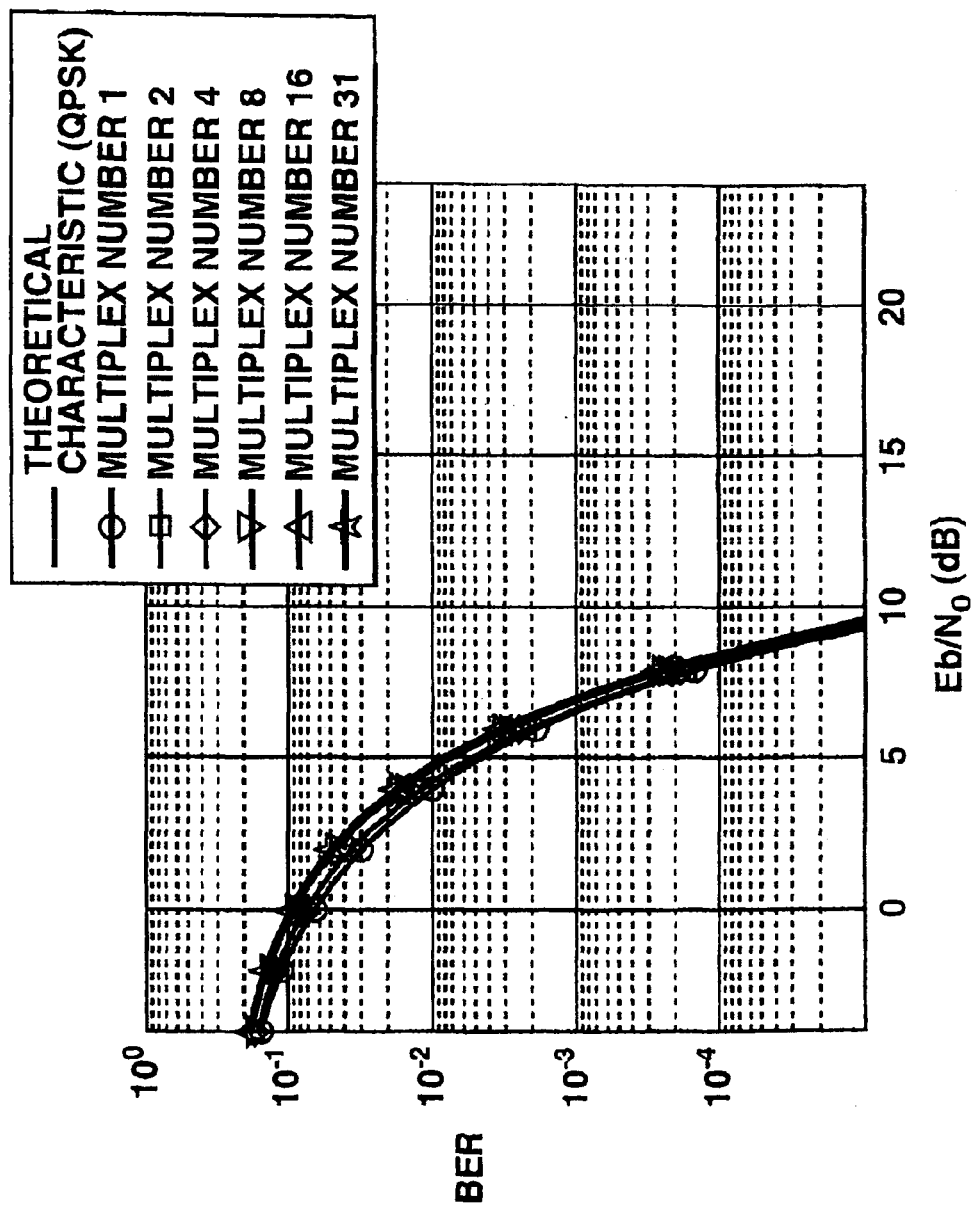

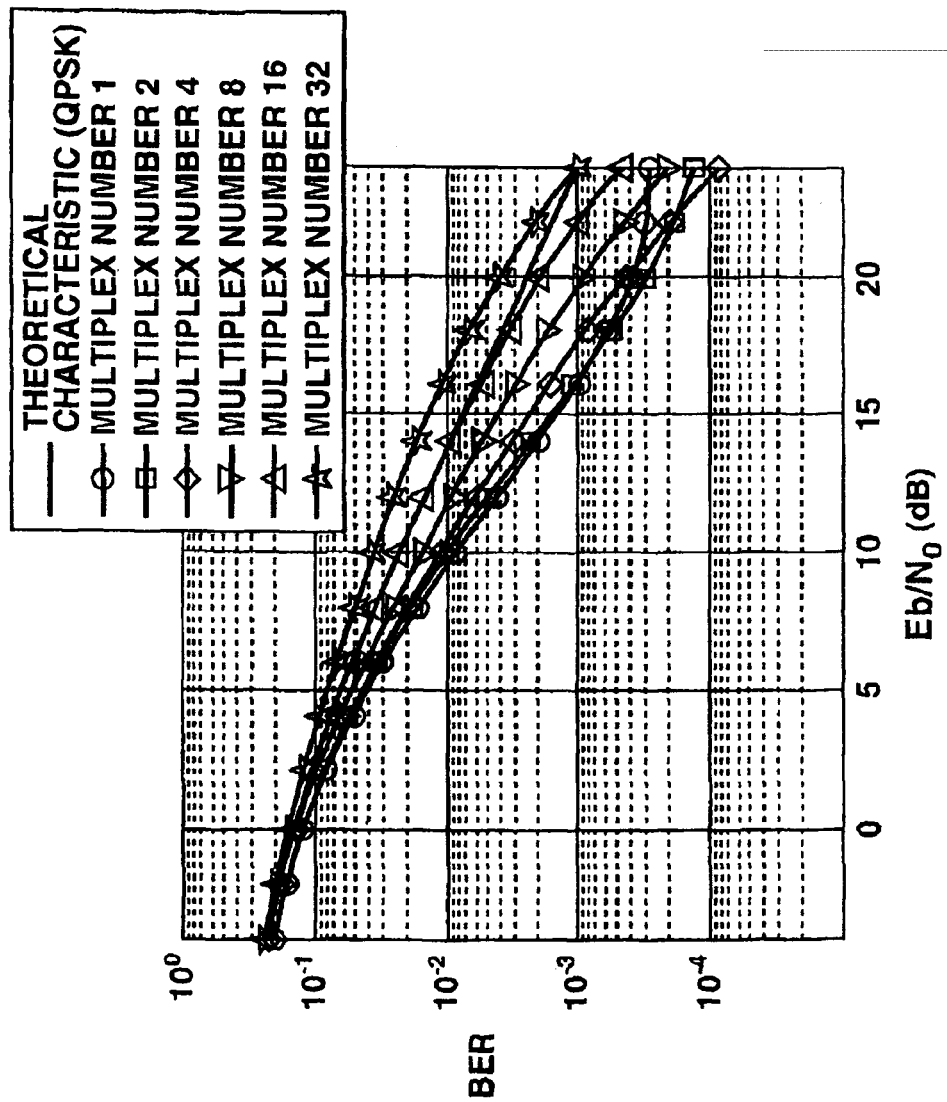

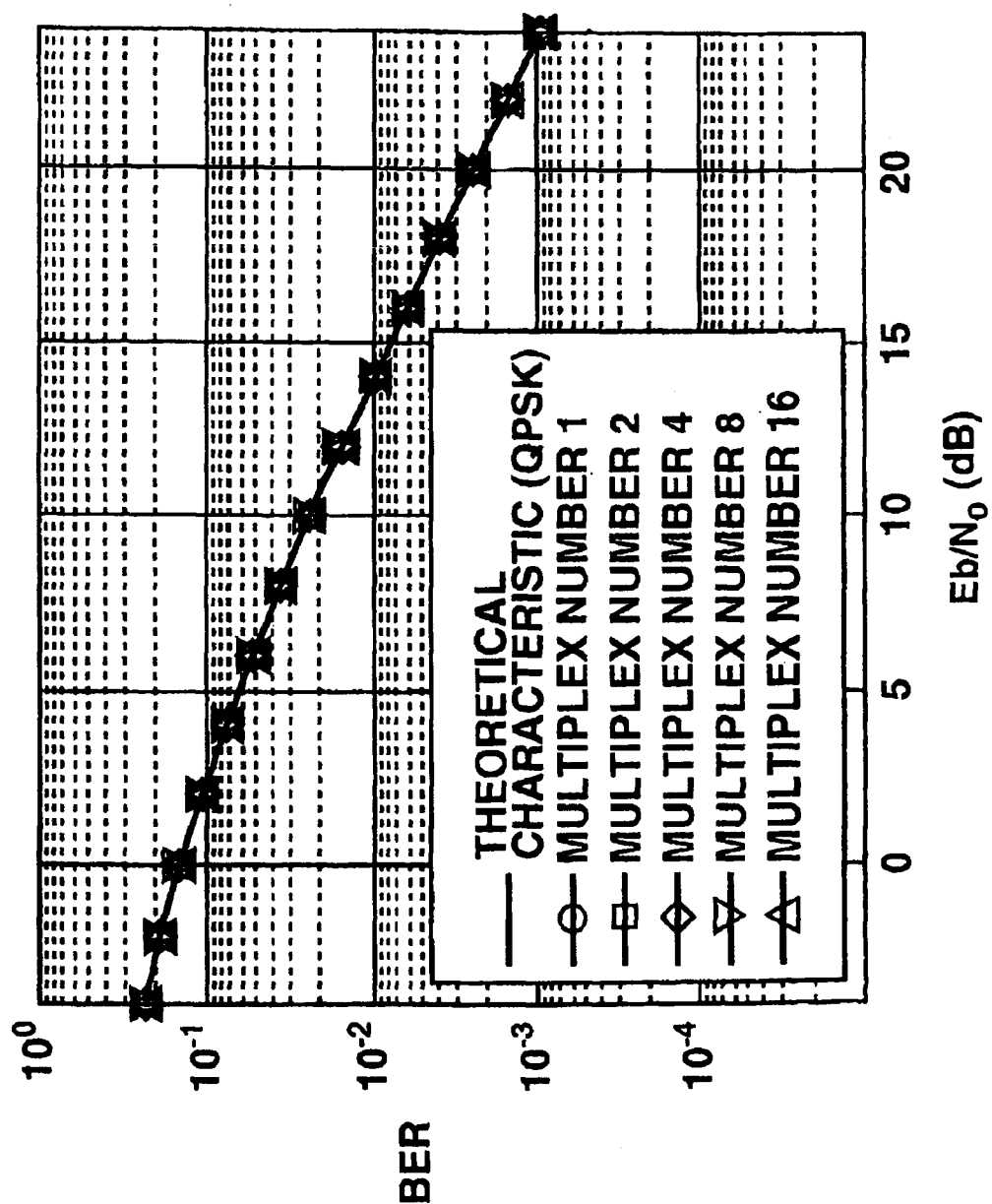

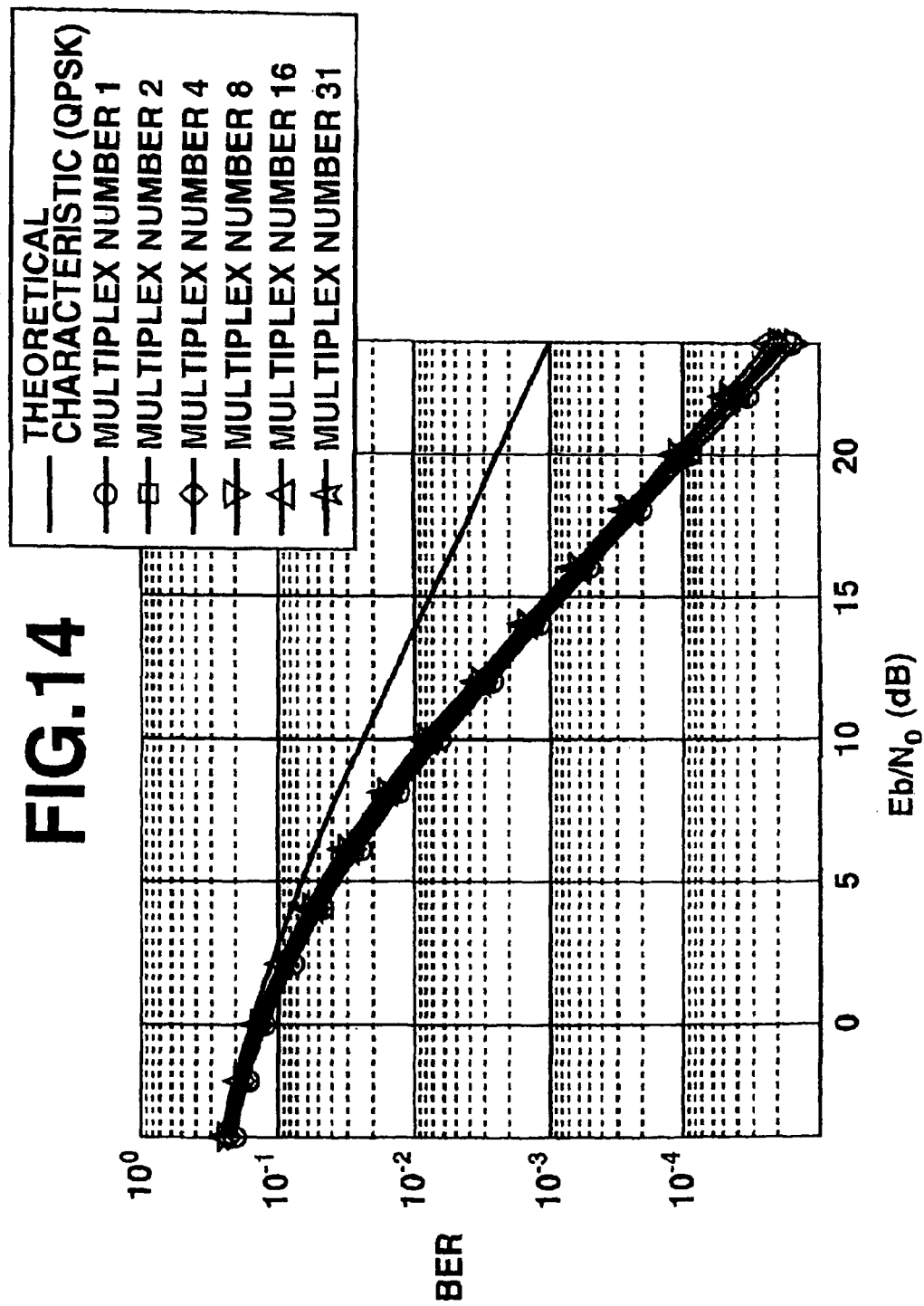

The invention claimed is:

1. A multicarrier code division multiple access (MC-CDMA) system comprising:
   a transmitter configured to multiply a first signal by a sinusoidal signal in a frequency domain to generate a second signal, wherein the sinusoidal signal has an amplitude of r and is orthogonal as a result that frequency periods are different among users, wherein the transmitter is also configured to spread and split the second signal into orthogonal sub-carriers, and wherein the transmitter is further configured to multiplex the orthogonal sub-carriers to generate a transmission signal; and
   a receiver configured to receive the transmission signal from the transmitter and to de-spread the transmission signal.

2. A multicarrier code division multiple access (MC-CDMA) receiver configured to receive a transmission signal, wherein the transmission signal is generated in part by multiplying a first signal by a sinusoidal signal in a frequency domain to generate a second signal, wherein the sinusoidal signal has an amplitude of r and is orthogonal as a result that frequency periods are different among users, wherein the second signal is split into orthogonal sub-carriers which are multiplexed to generate the transmission signal, and wherein the MC-CDMA receiver is configured to de-spread the transmission signal.

3. The MC-CDMA receiver according to claim 2, wherein a de-spreading process to de-spread the transmission signal is carried out using a Fourier transform.

4. The MC-CDMA receiver according to claim 2, wherein the receiver is configured to reset a phase of each of the orthogonal sub-carriers using a phase mask, and wherein de-spreading is implemented with a Fourier transform.

5. A multicarrier code division multiple access (MC-CDMA) transmitter configured to multiply a first signal by a sinusoidal signal in a frequency domain to generate a second signal, wherein the sinusoidal signal has an amplitude of r and is orthogonal as a result that frequency periods are different among users, wherein the transmitter is also configured to spread and split the second signal into orthogonal sub-carriers, and to multiplex the orthogonal sub-carriers to generate a transmission signal.

6. The MC-CDMA transmitter according to claim 5, wherein a spreading code used to spread the second signal is coincident with another spreading code with respect to a delay time of a delay wave.

7. The MC-CDMA receiver according to claim 2, wherein a spreading code used to spread the second signal is coincident with another spreading code with respect to a delay time of a delay wave.

8. The MC-CDMA transmitter according to claim 5, wherein the transmitter spreads the second signal using a spreading process and multiplexes the orthogonal subcarriers using a multiplexing process, wherein the spreading process and the multiplexing process are carried out using an inverse Fourier transform.

9. The MC-CDMA transmitter according to claim 5, wherein the transmitter spreads the second signal using a spreading process and multiplexes the orthogonal subcarriers using a multiplexing process, wherein the spreading process and multiplexing process are carried out using an inverse Fourier transform, and wherein the transmitter is further configured to shift the sub-carriers in phase using a phase mask.

\* \* \* \* \*

UNITED STATES PATENT AND TRADEMARK OFFICE
CERTIFICATE OF CORRECTION

PATENT NO. : 8,054,866 B2
APPLICATION NO. : 12/161128
DATED : November 8, 2011
INVENTOR(S) : Sasaoka et al.

It is certified that error appears in the above-identified patent and that said Letters Patent is hereby corrected as shown below:

On the Title Page, in Item [56], under "OTHER PUBLICATIONS", in Column 2, Line 2, delete "MC-CMDA" and insert -- MC-CDMA --, therefor.

In the Drawings:

In the drawings, Fig. 8, 9, 10, 11, 12, 13, 14 & 15 should be replaced with the corrected Fig. 8, 9, 10, 11, 12, 13, 14 & 15 as shown on the attached pages.

In Fig. 8, Sheet 8 of 15, delete "Eb/N0" and insert -- $Eb/N_0$ --, therefor at each occurrence throughout Figures 8, 9, 10, 11, 12, 13, 14 and 15.

In the Specifications:

In Column 1, Line 41, delete "phenamenon." and insert -- phenomenon. --, therefor.

In Column 1, Line 47, delete "IFF" and insert -- IFFT --, therefor.

In Column 3, Line 60, delete "A" and insert -- a --, therefor.

In Column 4, Line 4, delete "A" and insert -- a --, therefor.

In Column 4, Line 6, delete "A" and insert -- a --, therefor.

In Column 4, Line 11, delete "DESCRIPTION" and insert -- DETAILED DESCRIPTION --, therefor.

In Column 4, Line 30, delete "Fm" and insert -- $f_m$ --, therefor.

Signed and Sealed this
Twenty-seventh Day of August, 2013

Teresa Stanek Rea
*Acting Director of the United States Patent and Trademark Office*

CERTIFICATE OF CORRECTION (continued)
U.S. Pat. No. 8,054,866 B2

In Column 4, Line 30, delete "$F_m=m\Delta f$" and insert -- $f_m=m\Delta f$ --, therefor.

In Column 5, Line 6, delete "$d(k)$" and insert -- $d^{(k)}$ --, therefor.

In Column 5, Line 8, delete "$Vs(t)$" and insert -- $V_s(t)$ --, therefor.

In Column 5, Line 9, delete "$Vs(f).$" and insert -- $V_s(f).$ --, therefor.

In Column 8, Line 3, delete "n=2" and insert -- n=2. --, therefor.

In Column 8, in Table 1, Line 4, delete "QSPK" and insert -- QPSK --, therefor.